United States Patent
Shu

(10) Patent No.: US 7,334,514 B2
(45) Date of Patent: Feb. 26, 2008

(54) BALANCED FLUID-POWERED MODULAR ACTUATION SYSTEM

(75) Inventor: Jianchao Shu, 3719 Falls Trail, Winston, GA (US) 30187

(73) Assignee: Jianchao Shu, Winston, GA (US)

( * ) Notice: Subject to any disclaimer, the term of this patent is extended or adjusted under 35 U.S.C. 154(b) by 0 days.

(21) Appl. No.: 10/911,241

(22) Filed: Aug. 5, 2004

(65) Prior Publication Data

US 2005/0092171 A1     May 5, 2005

Related U.S. Application Data

(60) Provisional application No. 60/492,908, filed on Aug. 6, 2003.

(51) Int. Cl.
 *F01B 1/06* (2006.01)
(52) U.S. Cl. .............................. 92/68; 92/13.7; 92/148; 74/104; 74/109
(58) Field of Classification Search ................ 92/13.7, 92/68, 148; 74/104, 109
See application file for complete search history.

(56) References Cited

U.S. PATENT DOCUMENTS

| | | | |
|---|---|---|---|
| 1,667,559 A | 4/1928 | McCaleb | |
| 2,643,677 A * | 6/1953 | MacLean | ........................ 92/68 |
| 3,261,266 A | 7/1966 | Ledeen | |
| 3,565,391 A | 2/1971 | Zannini | |
| 3,693,501 A | 9/1972 | Ward | |
| 3,797,324 A * | 3/1974 | Sheesley et al. | .............. 92/138 |
| 3,971,295 A | 7/1976 | Nash | |
| 3,971,296 A | 7/1976 | Tugwell | |
| 3,982,725 A | 9/1976 | Clark | |
| 4,167,897 A | 9/1979 | Bunyard | |
| 4,203,351 A | 5/1980 | Schwind | |
| 4,337,691 A | 7/1982 | Tomaru | |
| 4,370,917 A * | 2/1983 | Bunyard | ........................ 92/68 |
| 4,463,662 A | 8/1984 | Okuyama | |
| 4,509,403 A | 4/1985 | Gassman | |
| 4,651,627 A * | 3/1987 | Stewart | ...................... 92/13.7 |
| 4,882,977 A | 11/1989 | Himeno | |
| 4,922,964 A | 5/1990 | Buscher | |
| 4,949,936 A | 8/1990 | Messina | |
| 5,014,598 A | 5/1991 | Champagne | |
| 6,453,261 B2 | 9/2002 | Boger | |

* cited by examiner

*Primary Examiner*—F. Daniel Lopez

(57) ABSTRACT

This invention provides a modular, efficient and self-feedback/balance, fluid-powered actuation system. This system comprises two basic modules; actuation module and positioning module, which are directly connected to each other. The actuation modules can be constructed as a triple acting actuator having a novel balanced linear-rotary mechanism converter or a double acting actuator with two novel balance guide bars. The positioning module is constructed as a two-staged, self-feedback/balance positioner with position as a variable for controlling positions of an output shaft of the actuation modules. An input shaft in the positioning module is operated by three types input signals. This system also provides a rotary force to actuate and control different rotary valves with lighter weight, superior seal and high accuracy and can be used for quick cycle, high vibration applications or other critical services.

10 Claims, 13 Drawing Sheets

BALANCED FLUID-POWERED MODULAR ACTUATION SYSTEM

CROSS REFERENCE TO RELATED APPLICATION

This application is entitled to benefit of Provisional Patent Application Ser. No. 60/492,908 filed, 2003 Aug. 6.

FEDERALLY SPONSORED RESEARCH

Not Applicable.

SEQUENCE LISTING OR PROGRAM

Not Applicable.

BACKGROUND

1. Field of Invention

This invention relates to a fluid-powered modular actuation system, more particularly to a self-feedback/balance, rotary actuation system. This system comprises a self-balanced, multiple-acting actuation module and a self-balanced, digital/non-digital, servo-positioning module. This system provides a rotary force to actuate and control different rotary valves with smaller size and higher accuracy and can be interfaced with different valves, power suppliers and control devices, those modules can be used separately with other control devices and valves.

2. Description of Prior Art

Conventional fluid-powered actuation systems comprise many components such as actuators, positioners and accessories, the components are designed and manufactured by different manufactures with different interfaces in compliance with different standards. In most cases, the components do not fit and work well with each other in terms of system performances, such as response time, accuracy of position and stability. In addition the conventional fluid-powered rotary actuation systems have many unsolved problems and disadvantages, such as heavy weight, high leakage, slow response, low accuracy, extra adapters, tubes and brackets for unmatched interfaces, lower reliability and lack of intrinsic safety features.

The most conventional rotary actuators are based on two types of linear-rotary movement conversion mechanisms; scotch-yoke and rack-pinion. They all have a common problem; unbalanced side loading forces, either on linear movement side or rotary movement side. As a result, the actuators have lower efficiency, heavy weight, high friction and high maintenance cost and are expensive to produce, and those problems largely prevent the actuators from being used in precision flow controls, fast operations or critical applications on medical equipment, aircraft and military services. On the other hand, the conventional positioners based on mechanical linkage/cam or balanced beam mechanisms have not changed over the years, those positioners have poor dynamic performances, such as slow response, large dead band, less accuracy and poor repeatability and they are not suitable for digital control applications, some positioners have been developed for those applications, but such positioners are either too expensive or not reliable.

In order to overcome the disadvantages of the conventional fluid-powered rotary actuation systems, many efforts have been made in the prior arts. There are four approaches to improve the conventional actuation systems in the prior arts, but those approaches work against each other within a limited scope.

The first approach is to simplify interfaces between actuators and positioners, U.S. Pat. No. 3,971,295 to Alan Richard Brine Nash (1976) disclosed an improved positioner with direct mounting on a rotary actuator, but there is no significant improvement in the positioner, on the other hand U.S. Pat. No. 4,882,977 to Toshio Himeno (1989) shows a systematical approach to mount a positioner directly on an actuator, but the system employing external conduit network between the positioner and the actuator is less compact and highly subject to breakage and external damage of fluid tubing.

The second approach is to ease consequences of the unbalanced side loading forces on actuators based on the scotch-yoke mechanism, since such mechanism has been used in fluid-powered actuation for years, many efforts were made, U.S. Pat. No. 3,261,266 to Hyman Ledeen (1966) shows an actuator with two cylinders or four cylinders, but the actuator employing external conduit network is extremely large and highly subject to breakage and external damage of fluid tubing, the yoke is subject to external corrosion and breakage, although the force on the yoke on four cylinder actuator is balanced but not efficient, the rod of pistons is under an unbalanced side loading force as the yoke moves away from 0 degree and has high leakage. U.S. Pat. No. 4,337,691 to Hisao Tomaru (1982) discloses a new design by easing consequence of unbalanced loading force on the linear side with bearings made out of lower friction materials but not on rotary side, the unbalanced side loading force on the yoke increases not only the friction between yoke and bearing, but also loading on the yoke which is required a much larger diameter to stand a combination of bending and torsion, on the contrary, U.S. Pat. No. 4,463,662 to Yukio Okuyama (1984) shows us a design to balance side forces on the yoke by employing a pair of pistons on opposite sides of yoke, but no effort was made to balance side loading forces on linear side.

The third approach is to improve performances and ease consequences of unbalanced side loading forces on actuators based on the rack-pinion mechanism. U.S. Pat. No. 1,667,559 to A. G. McCaleb (1928) shows us a typical example of rack-pinion double piston actuator, since then most efforts have been made to ease the consequence of unbalanced side loading force on the pistons, U.S. Pat. No. 4,167,897 to Alan D. Bunyard (1979) shows an improved rack-pinion actuator to ease the consequence of side loading force with extensions of pistons and bearings on the linear side, U.S. Pat. No. 4,203,351 to Heinz G. Schwind (1980) shows an improved rack-pinion actuator with three extensions to prevent the pistons to rotate and ease the consequence of unbalanced side force on pistons. In short, all the prior arts either fail to solve or did not recognize the unbalanced forces on both sides of linear-rotary conversion mechanism and rotary shaft leakage under side loading. In addition, the conventional actuators employ a pair of screws with nuts to control a rotation of output shaft either on linear side or rotary side through pressurized chamber, such structures not only create potential two leak paths and add unbalanced side force every time the screws are hit, but also increase the twist angle of output shaft and weaken output shaft as shown in U.S. Pat. No. 4,949,936 to Aurelio Messina (1990), moreover, the output shaft is axially constrained by two retaining rings, such arrangement not only requires a precision groove machining, but also increase difficulty of assembly with two grooves stack errors.

The fourth approach is to improve performances of the positioners, a typical example of the positioner is shown in U.S. Pat. No. 3,693,501 to Edward J. Ward et al (1972) and U.S. Pat. No. 3,971,295 to Alan Richard Brine Nash (1976), the positioner is based on a spool valve with mechanical linkages and cam feedback, while U.S. Pat. No. 3,565,391 to Benito C. Zannini (1971) and U.S. Pat. No. 4,509,403 to George W. Gassman (1985) disclose pneumatic positioners based on air relays with mechanical linkages and balanced beam, but they all need an extensive adjustment for setting a balanced point with a considerable moving parts in the mechanical linkages, the structures based on force-position feedback not only have a slow response time and high cumulative error, but also has inherently low reliability and large dead band and is susceptible to vibration and unstable, the positioner can not be used in services, such as high cycle, high vibration and quick opening or closing.

Even some newly developed positioners have some improvements with embedded microprocessors shown in U.S. Pat. No. 6,453,261 to Henry Boger et al (2002), but the fundamental control mechanism is still unchanged, the software route only can improve the performance with a limited scope, so at best, the positioning system has a novel diagnosis function, but the system is very complicated and expensive to produce, there is a great demand for a high reliable, digital-friendly positioner with high performance as good as or closed to the electronic positioner but at much lower cost. In fact, the most hydraulic positioners are based on conventional servo valves with flapper-nozzle structure shown in U.S. Pat. No. 4,922,964 to John H. Buscher (1990), the servo valve not only lacks self-feedback function, but also requires a filter for preventing fluid contamination and additional ports for fluid communication, moreover, an input signal generated by the torque motor is analog and expensive to be digitized.

So the fluid-powered actuation industry has long sought means of improving the performance of fluid-powered actuation system, eliminating the unbalanced side loading forces on both sides of linear-rotary conversion mechanism, reducing shaft leakage, response time and increasing reliability and accuracy with less cost.

In conclusion, insofar as I am aware, no fluid-powered actuation system formerly developed provides higher system performances with a modularization structure, less parts, highly efficient, versatile, reliable, easy manufacturing at lower cost, such system can be controlled by different type of input signals.

SUMMARY

This invention provides a highly reliable, modular, compact, efficient and self-feedback/balance actuation system. This system comprises two basic modules; actuation module and positioning module which are directly connected to each other without extra tubes, adapter and bracket, the actuation module can be constructed as a self-balanced, multiple-acting actuator, the positioning module can be constructed as a self-feedback/balanced, digital/non-digital servo positioner. This system provides a rotary force to actuate and control different rotary valves with smaller space and higher accuracy o and can be used for quick cycle, high vibration, quick opening or closing applications or other critical services. Those modules can be interfaced with different valves, power suppliers and control devices together or separately.

The actuation module can be constructed as a triple acting actuator for 0-90 degree rotation, the actuator comprises a body having a centered vertical bore extending to three horizontal passageways which contain an output shaft, a novel balanced linear-rotary mechanism (either rack-pinion or scotch-yoke) converter unit and three pistons. The each piston disposed in the horizontal passageways is attached to a piston rod of the converter unit; the converter unit located in the centered vertical bore is coupled with the output shaft. Inlet/outlet ports are directly connected to the positioning module without extra tubes and brackets and for fluid communications between fluid source/sink and a novel internal porting system, the internal porting system has two conduits which are connected to both sides of the three pistons, three pistons under a pressurized fluid make reciprocal, linear movement synchronously to generate a rotary movement through the converter unit without unbalanced side loading force either on linear side or rotary side of the converter unit.

The actuation modules can be constructed a double acting actuator for 0-90 or 0-180 degree rotations, the actuator comprises a body having a cylindrical passageway which includes two pistons, the two pistons have radically opposed skirts with gear racks in inner surfaces to operatively engage with a pinioned output shaft in center of the cylindrical passageway and have axially opposed guide bars inserted in holes on inward surfaces on the skirts as a novel moving guides without contact of wall of the cylindrical passageway. Inlet/outlet ports on the actuation modules is directly connected to inlet/outlet ports of the positioning module and is provided for fluid communications between pressurized fluid source/release fluid sink and a novel internal porting system which comprises two conduits connected to both sides of the two pistons. The pistons under a pressurized fluid can slide linearly back and forth in the cylindrical passageway to generate a rotary movement through rack-pinion mechanism on the pinioned shaft.

The above two actuators can have a travel adjustment/position unit located on button of the actuators without any leak path, two of screws are provided to engage with a moon-shape groove on the output shaft to control rotation of the output shaft, two position screws are provided to prevent an axial movement between the output shaft and actuator body. A novel seal between the output shaft and the body is provided for both actuation modules and is provided with one O-ring attached to the body and two O-ring attached to the shaft for preventing leakage when the shaft is rotated.

The positioning module is constructed as a two-staged, self-feedback/balance servo positioner for controlling position of the output shaft of the actuation modules. The positioner comprises a main valve, a balance unit and a pilot valve. The main valve comprises four-way spool valve to direct fluids between pressurized fluid source/release fluid sink and inlet/outlet of ports which are connected to the actuation module. The pilot valve comprises a linear-rotation mechanism for converting an input signal to a rotation of input shaft, and a position indicator for indicating a set point position of the input shaft and a position of a feedback shaft. The balance unit comprises a self-balance mechanism to rotate the feedback shaft to a null position with the input shaft at a set position.

Accordingly, besides objects and advantages of the present invention described in the above patent, several objects and advantages of the present invention are:

(a) To provide a fluid-powered modular actuation system with multiple functions; different torque characteristics, different control means and different interfaces to actuate different types of control valves with higher versatility and fewer components.

(b) To provide a fluid-powered actuation system with highly optimal division of functions among the modular members in a balanced manner. Such system allows a user to have higher integrity of a system with fewer components and reduce a system space, leakage, tuning time and learning curve.

(c) To provide a directly coupling means for an actuator and a positioner so as to eliminate adapters, tubes and brackets for their connection.

(d) To provide a fully balanced linear-rotary conversion means for a fluid-powered actuation system, so the system is efficient, powerful and reliable with less weight, parts and cost without unbalance side loading forces.

(e) To provide a fluid-powered actuation system with actuator, which has similar, minimum fluid volumes on both sides of pistons, so the energy loss can be reduced to a minimum level.

(f) To provide an internal porting means for a fluid-powered actuation system, the system is not subject to external tube corrosion and breakdown and has quick response time.

(g) To provide a novel self-balance control means for a fluid-powered actuation system, the control means is only dependent on relative positions, so the control means is not susceptible to vibration and more stable and becomes simpler, more reliable, more accurate and much easy to set up and can be used in applications of high vibration, quick cycle, quick opening or closing.

(h) To provide a novel position control means for a fluid-powered actuation system, so the system has both position controllers and multiple types of limit switches.

(i) To provide a rotary control means for a fluid-powered actuation system, so the system become more stable and accurate without dead band, and more adaptable, much easier to tune and control with less control overhead at lower cost.

(j) To provide a digital control-friendly product. With a stepper motor as means of input signal, D/A converts A/D converts and position sensor can be eliminated.

(k) To provide a fluid-powered actuation system with multiple input signals such as digital signal, pressurized fluid or manual knob movement, so users can have more options to control the fluid-powered system when required.

(l) To provide a fluid-powered actuation system with highly reliable, inherently redundant, intrinsically safe control means, so the system can be used for critical applications such as military operation, medical emergence care, and aircraft.

(m) To provide a produced-friendly, fluid-powered actuation system with simple, flexible structures, easy manufacturing and various material selection, so a manufacturer for the system can easily implement rapid product development and outsourcing at lower cost.

(n) To provide a used-friendly fluid-powered actuation system with a rotary control means, so to tuning the fluid-powered actuation system in different application become much easy, less time consuming on programming a controller.

(o) To provide a fluid-related device with rotary shaft seal means, so the devices with the seal means can maintain a good seal even under heavy side loading.

Still further objects and advantages will become apparent from study of the following description and the accompanying drawings.

DRAWINGS

Drawing Figures

Figure 1:
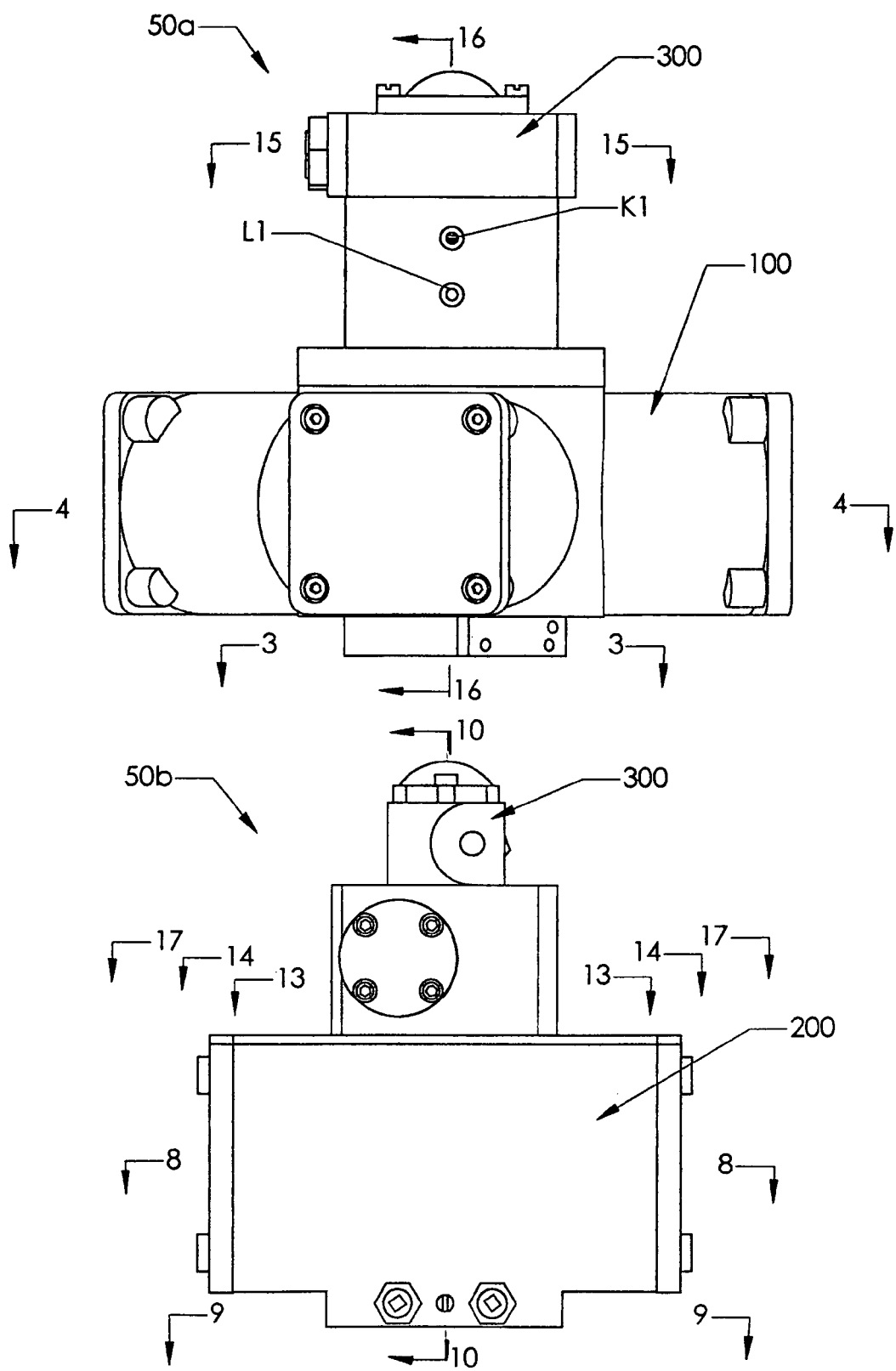
FIG. 1 is a front view of two embodiments of a fluid-powered actuation system constructed in accordance with this invention.
Figure 2:
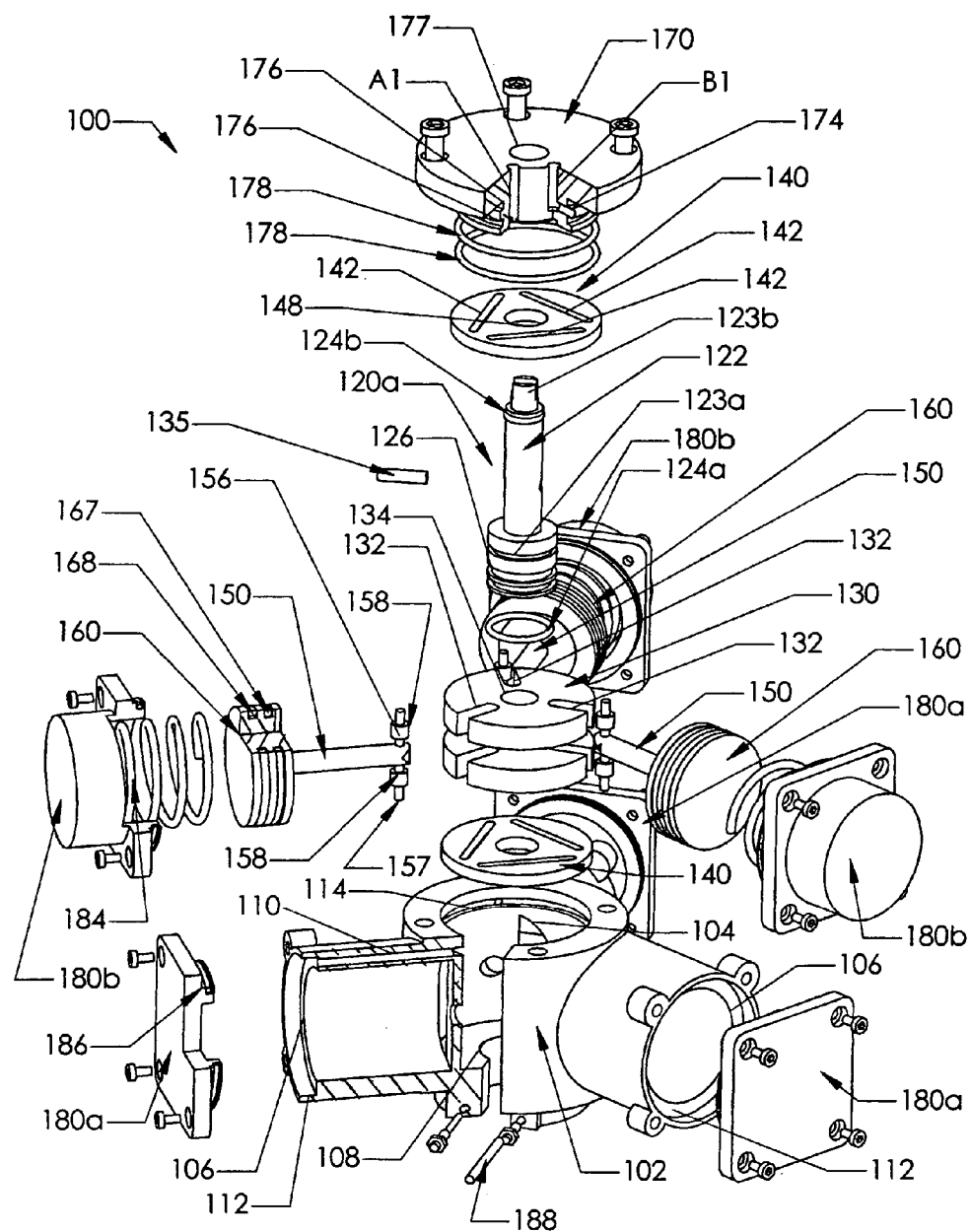
FIG. 2 is an exploded view of triple acting actuation module of the upper embodiment of the fluid-powered actuation system of FIG. 1.
Figure 4:
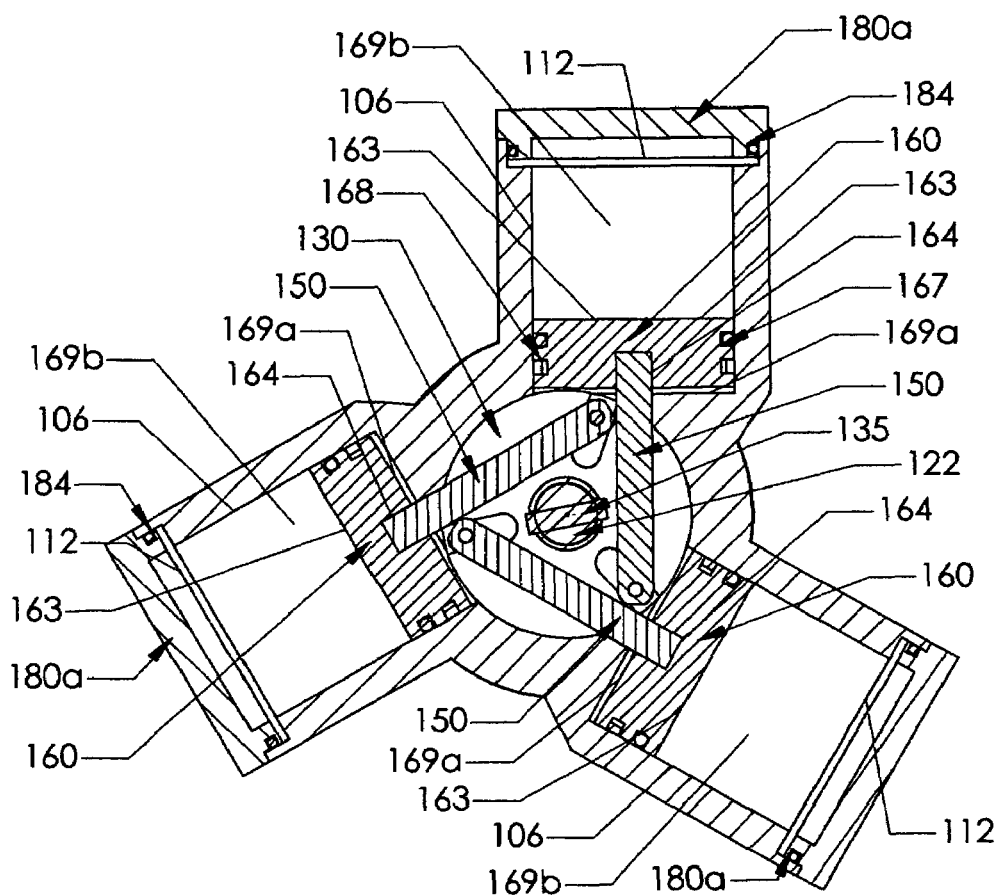
Figure 5:
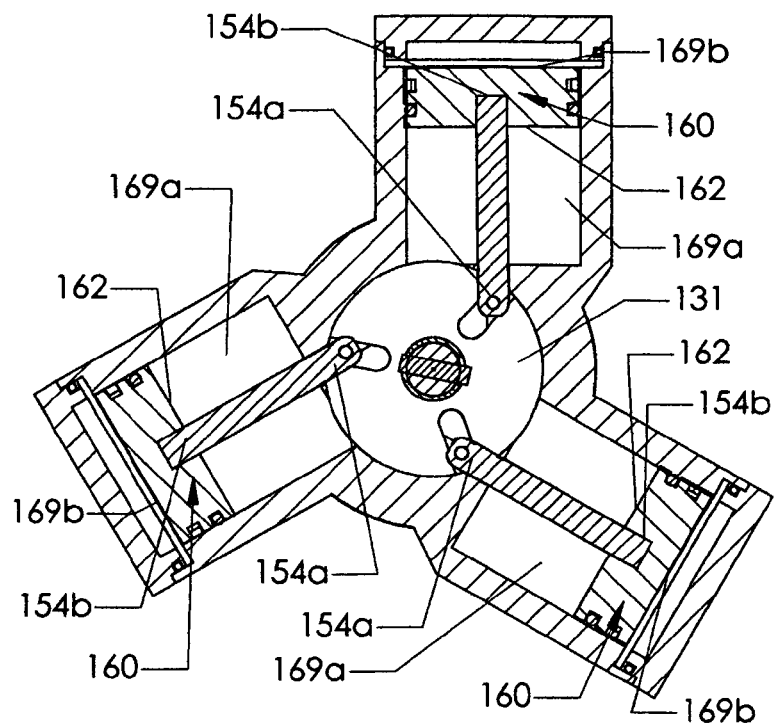
Figure 6:
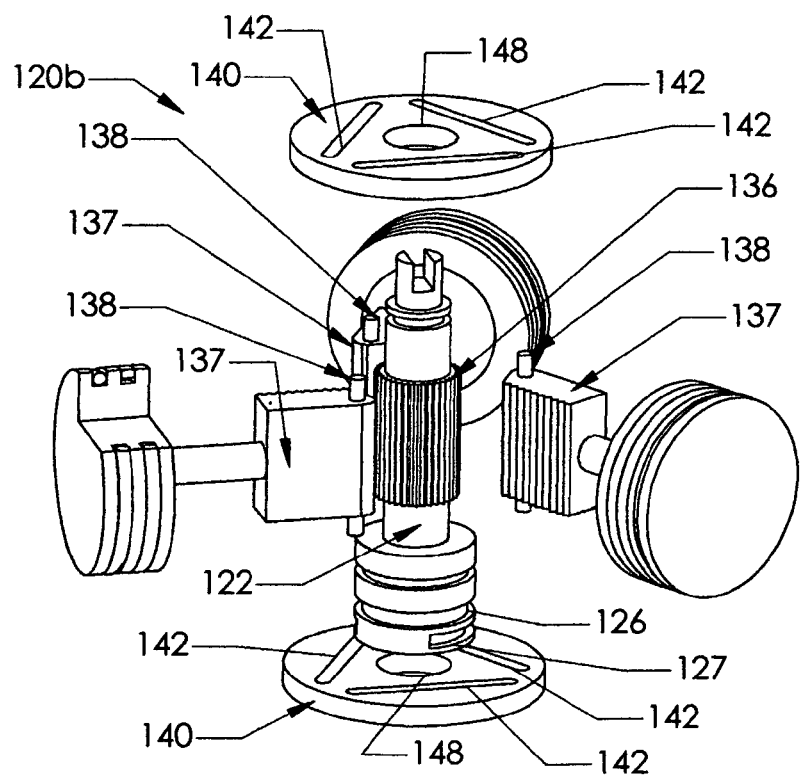

FIG. 4 is a cross-sectional view of triple acting actuation module of the upper embodiment of the fluid-powered actuation system of FIG. 1 along line 4-4 when pistons of the triple actuation module are moving inward FIG. 5 is a cross-sectional view of triple acting actuation module of the upper embodiment of the fluid-powered actuation system of FIG. 1 along line 4-4 when pistons of the triple actuation module are moving outward FIG. 6 is an exploded view of rack pinion driver of triple acting actuation module of FIG. 2.

Figure 7:
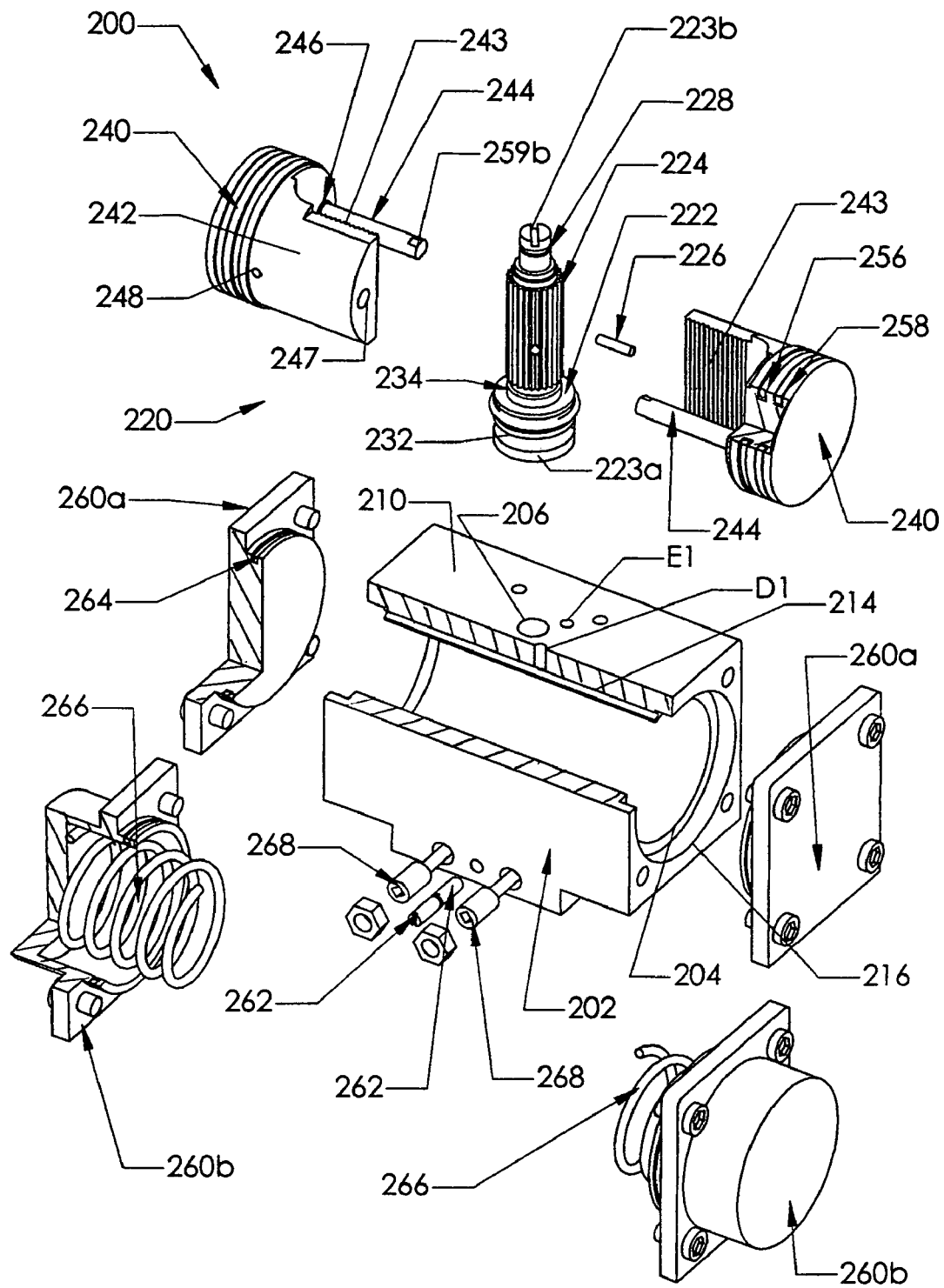

FIG. 7 is an exploded view of double acting actuation module of the lower embodiment of the fluid-powered actuation system of FIG. 1.

Figure 8:
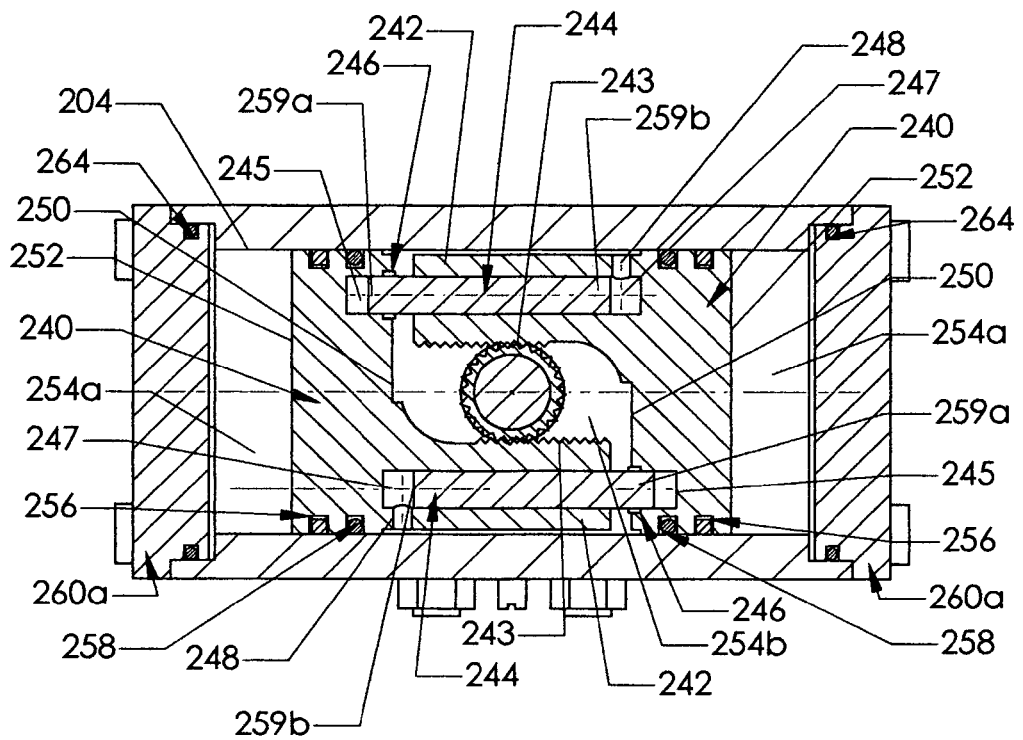
Figure 9:
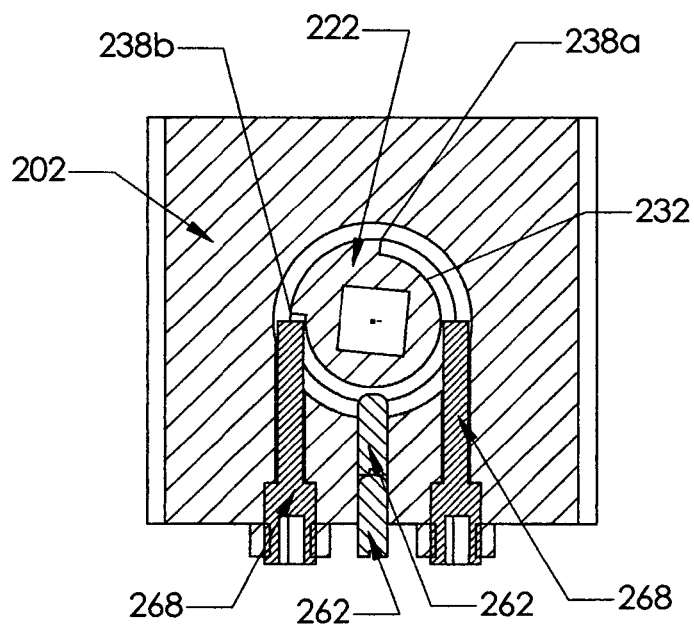

FIG. 8 is a cross-sectional view of double acting actuation module of the lower embodiment of the fluid-powered actuation system of FIG. 1 along line 8-8 when pistons of the double actuation module are moving inward FIG. 9 is a cross-sectional view of double acting actuation module of the lower embodiment of the fluid-powered actuation system of FIG. 1 along line 9-9.

Figure 10:
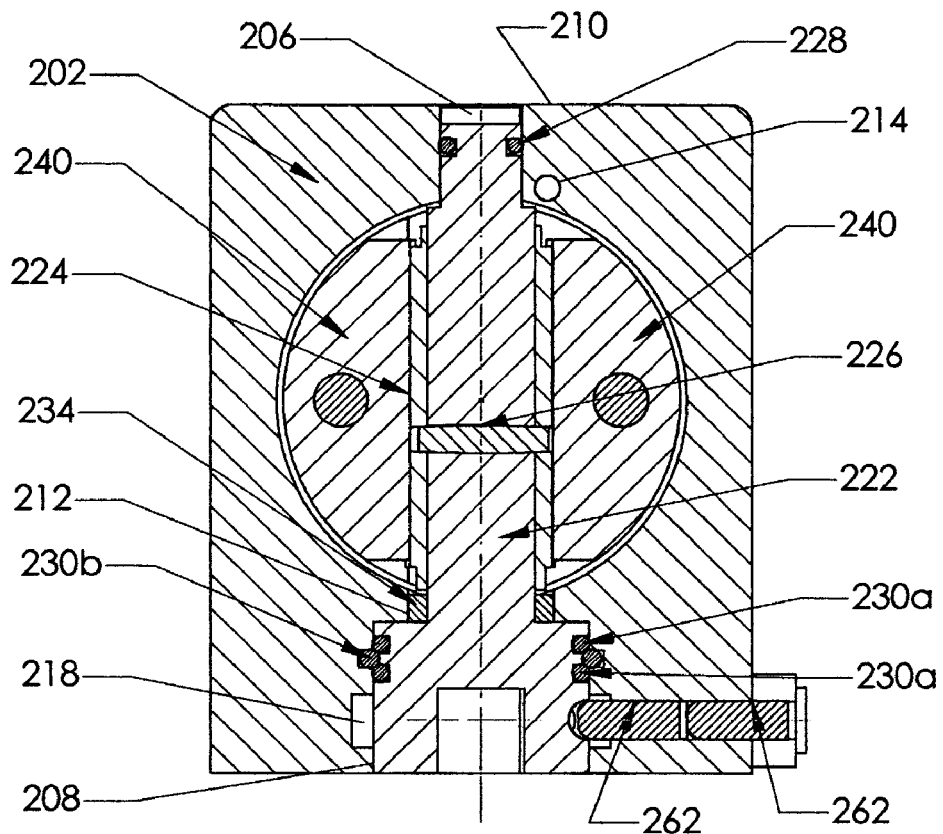

FIG. 10 is a partial cross-sectional view of double acting actuation module of the lower embodiment of the fluid-powered actuation system of FIG. 1 along line 10-10.

Figure 11:
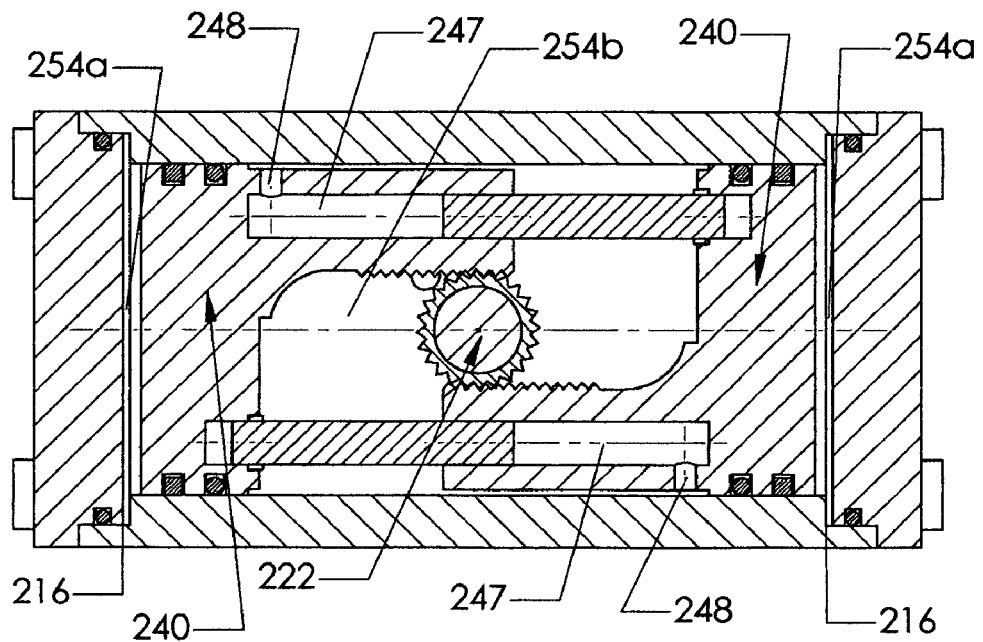

FIG. 11 is a cross-sectional view of double acting actuation module of the lower embodiment of the fluid-powered actuation system of FIG. 1 along line 8-8. when pistons of the double actuation module are moving outward.

Figure 12:
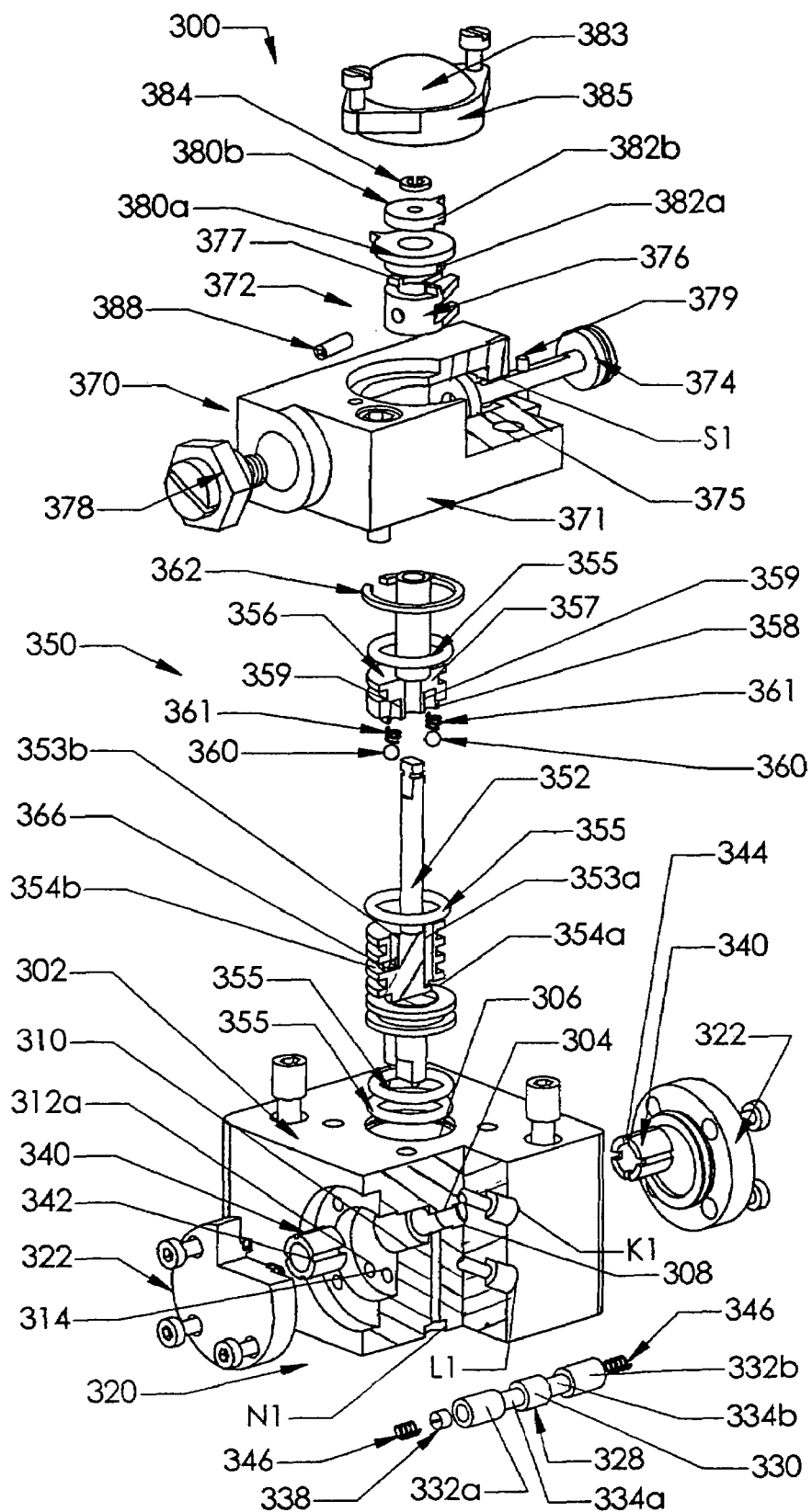

FIG. 12 is an exploded view of positioning module of the two embodiments of the fluid-powered actuation system of FIG. 1.

Figure 13:
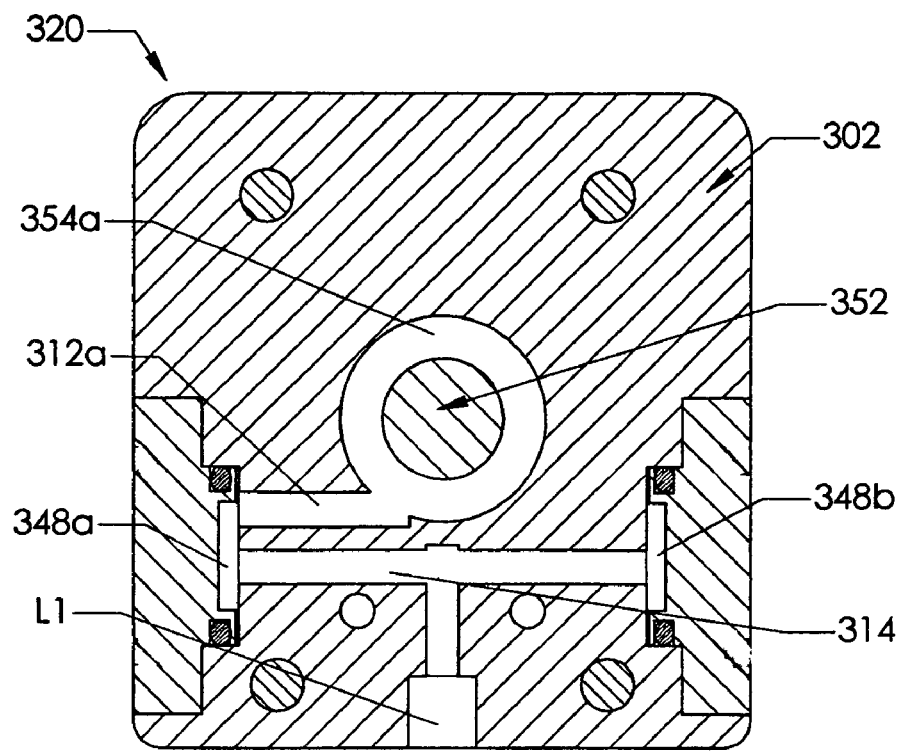

FIG. 13 is a cross-sectional view of positioning module of the two embodiments of fluid-powered actuation system of FIG. 1 along line 13-13.

Figure 14:
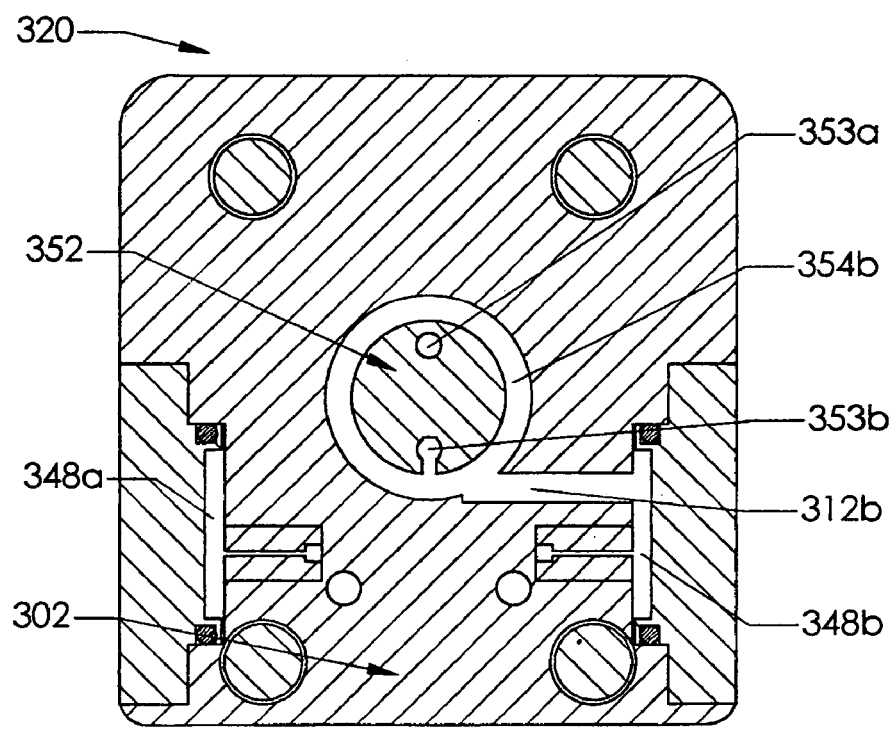

FIG. 14 is a cross-sectional view of positioning module of the two embodiments of the fluid-powered actuation system of FIG. 1 along line 14-14.

Figure 15:
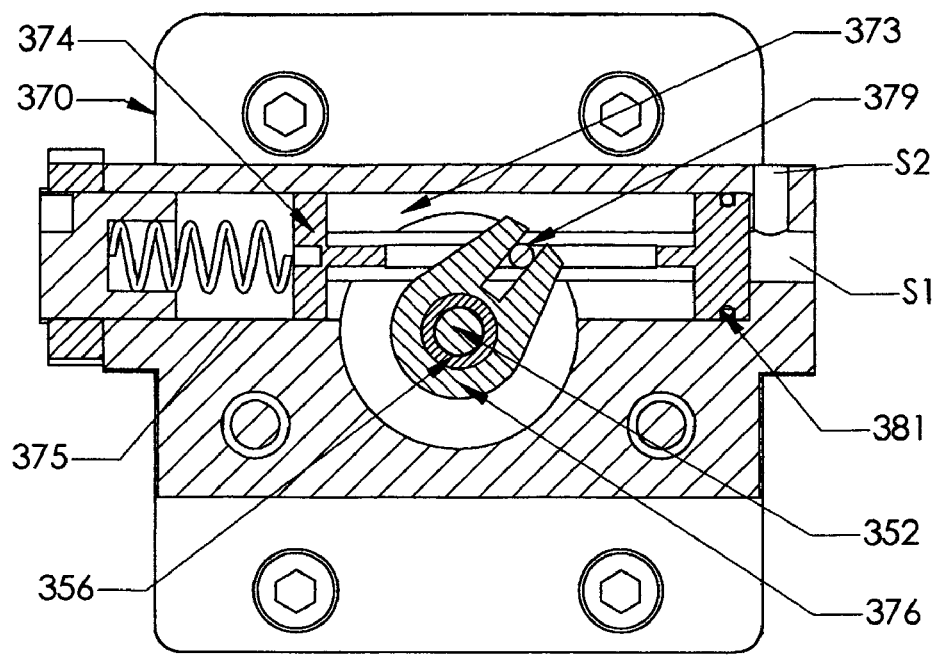

FIG. 15 is a cross-sectional view of positioning module of the two embodiments of the fluid-powered actuation system of FIG. 1 along line 15-15.

Figure 16:
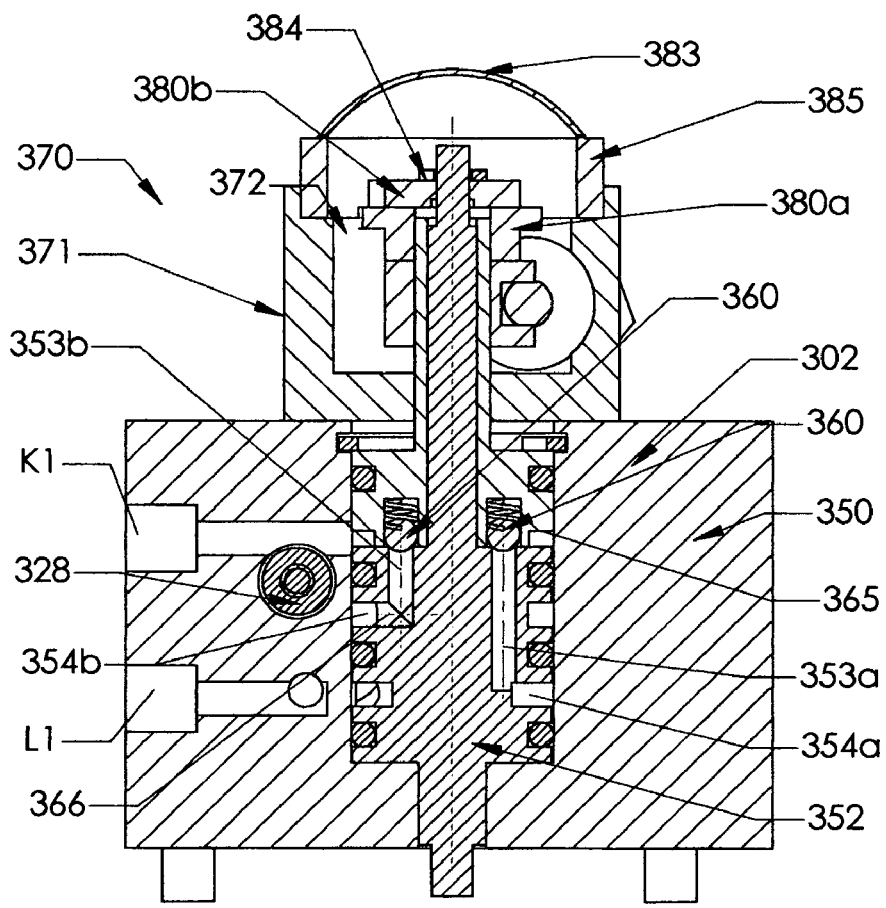

FIG. 16 is a partial cross-sectional view of positioning module of the two embodiments of the fluid-powered actuation system of FIG. 1 along line 16-16 when an input shaft and an output shaft are at a balanced, null position.

Figure 17:
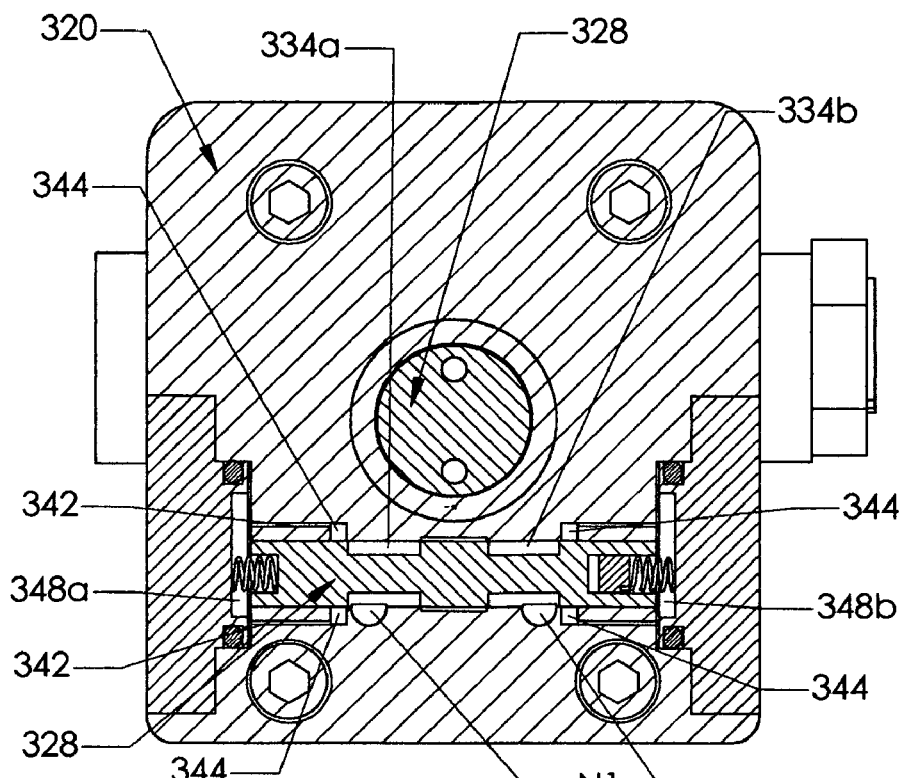

FIG. 17 is a cross-sectional view of positioning module of the two embodiments of the fluid-powered actuation system of FIG. 1 along line 17-17 when a spool of the positioning module is at a null position.

Figure 18:
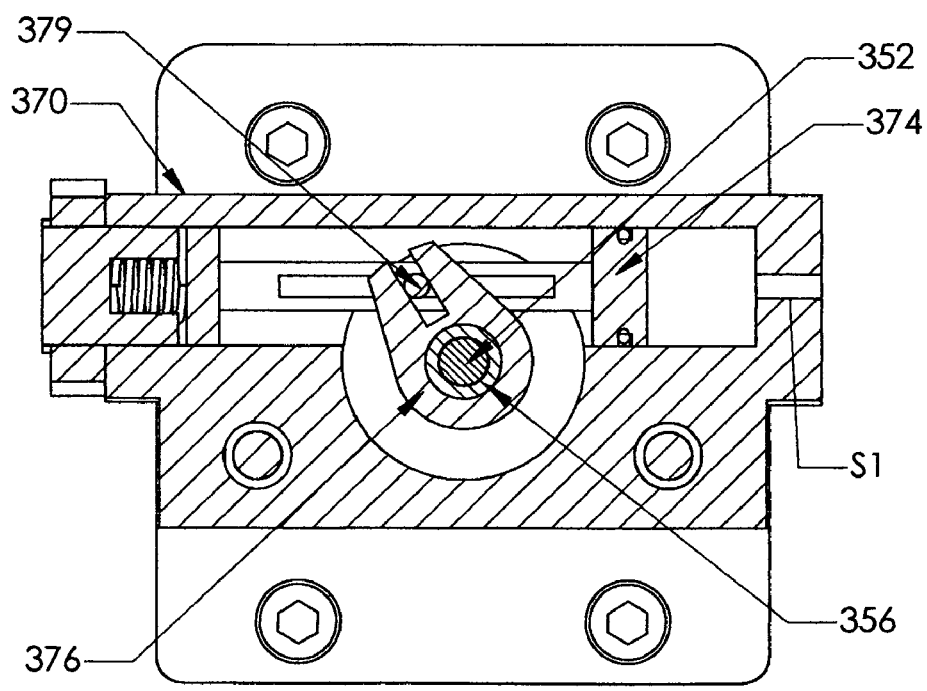

FIG. 18 is a cross-sectional view of positioning module of the two embodiments of the fluid-powered actuation system of FIG. 1 along line 15-15 when piston of the positioning module is moving left.

Figure 19:
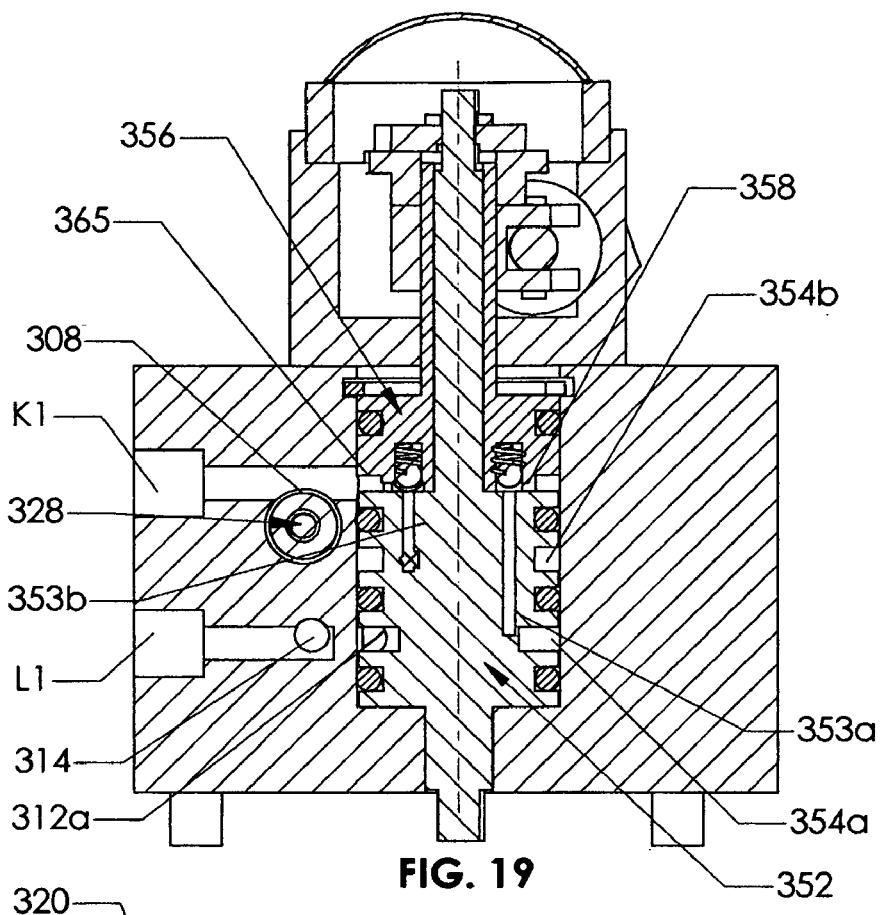

FIG. 19 is a partial cross-sectional view of positioning module of the two embodiments of the fluid-powered actuation system of FIG. 1 along line 16-16 when the input shaft and the output shaft are not at a balanced, null position.

Figure 20:
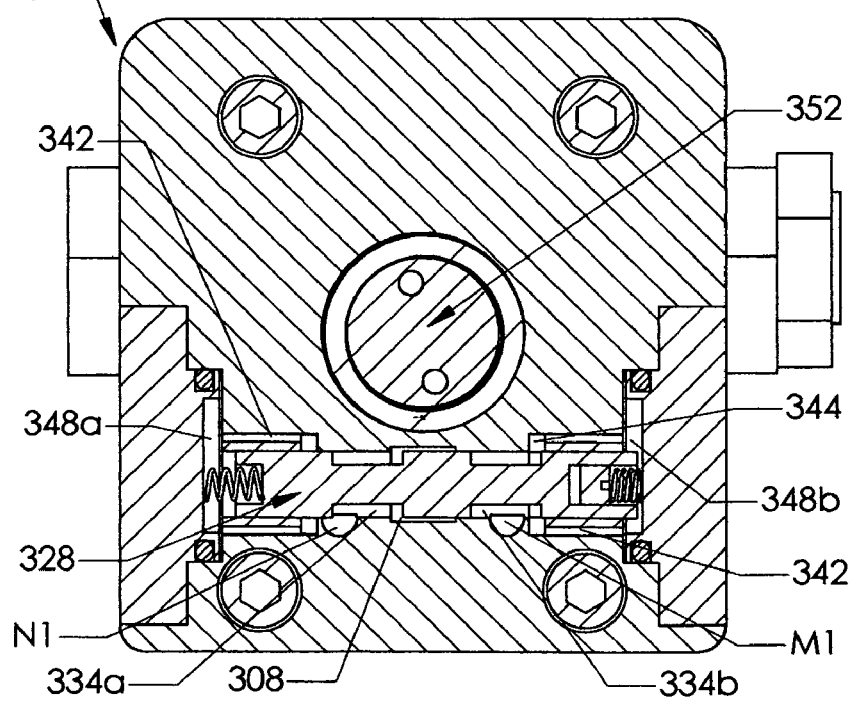

FIG. 20 is a cross-sectional view of positioning module of the two embodiments of the fluid-powered actuation system of FIG. 1 along line 17-17 when the spool of the positioning module is moving right.

Figure 21:
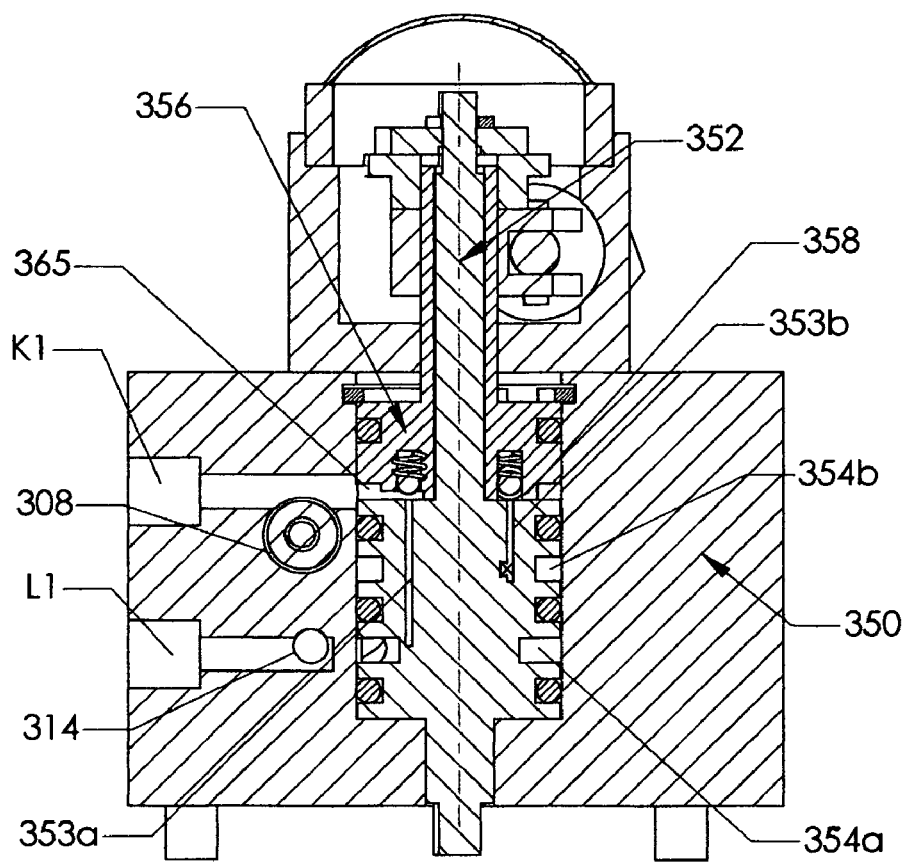

FIG. 21 is a partial cross-sectional view of positioning module of the two-embodiments of the fluid-powered actuation system of FIG. 1 along line 16-16 when the input shaft and the output shaft are not at a balanced, null position.

Figure 22:
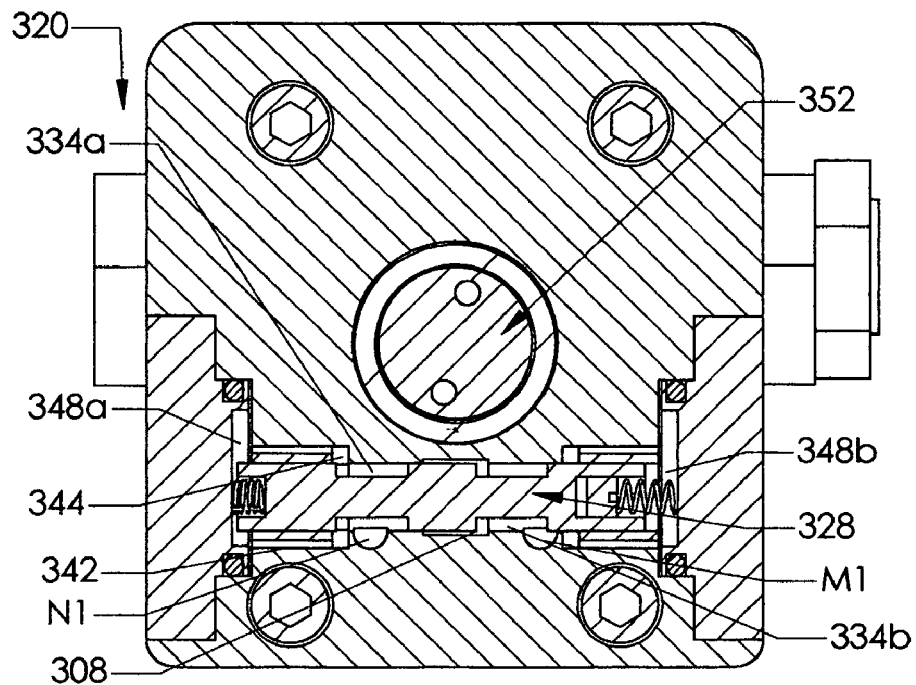

FIG. 22 is a cross-sectional view of positioning module of the two embodiments of the fluid-powered actuation system of FIG. 1 along line 17-17 when the spool of the positioning module is moving left.

Reference Number In Drawing

| 50 | Embodiment a, b | 200 | Double acting actuation module |
|---|---|---|---|
| 100 | Triple acting actuation module | 300 | Positioning module |
| A1 | Inlet port | | |
| B1 | Outlet port | 142 | Guide plate slot |
| 102 | Body | 148 | Guide plate hole |
| 104 | Vertical bore | 150 | Piston rod |
| 106 | Horizontal passageway | 154 | Piston rod end a, b |
| 108 | Center hole | 156 | Piston rod hole |
| 110 | Horizontal port | 157 | Guide pin |
| 112 | Stepped bore | 158 | Bearing |
| 114 | groove | 160 | Piston |
| 120 | Converter unit a, b | 162 | Piston inward surface |
| 122 | Output shaft | 163 | Piston outward surface |
| 123 | Shaft end, a, b | 164 | Threaded hole |
| 124 | O-ring a, b | 167 | Piston O-ring |
| 126 | Shaft position groove | 168 | Piston Bearing |
| 127 | Shaft moon-shaped groove | 169 | Chamber a, b |
| 128 | Stopper a, b | 170 | Top cap |
| 130 | Roller | 174 | Circumferential port |
| 131 | Roller groove | 176 | Cover groove |
| 132 | Roller opening | 177 | Hole |
| 134 | Roller hole | 178 | O-ring |
| 135 | Locked pin | 180 | Side cap a, b |
| 136 | Geared bushing | 184 | Spring |
| 137 | Gear block | 186 | O-ring |
| 138 | Pin | 188 | Position screw |
| 140 | Guide plate | 189 | Control screw |
| D1 | Outlet port | E1 | Inlet port |
| 202 | body | 242 | Skirt |
| 204 | Horizontal Passageway | 243 | Geared rack |
| 206 | Vertical hole | 244 | Guide bar |
| 208 | Lower counter bore | 245 | Threaded hole |
| 210 | Upper interface | 240 | Piston |
| 212 | Counter bore | 246 | Lock nut |
| 214 | Horizontal port | 247 | Hole |
| 216 | Stepped bore | 248 | Damping hole |
| 218 | Groove | 250 | Piston inward surface |
| 220 | Converter unit | 252 | Piston outward surface |
| 222 | Output shaft | 254 | Chamber a, b |
| 223 | Shaft end, a, b | 256 | Piston O-ring |
| 224 | Geared bushing | 258 | Piston Bearing |
| 226 | Pin | 259 | Bar end a, b |
| 228 | O-ring | 260 | Side cap a, b |
| 230 | Oring, a, b | 262 | Position screw |
| 232 | Shaft moon-shaped groove | 264 | O-ring |
| 234 | Bearing | 266 | Spring |
| 238 | Stopper a, b | | |
| K1 | Sink port | 354 | Groove a, b |
| L1 | Source port | 355 | O-ring |
| M1 | Inlet port | 356 | Input shaft |
| N1 | Outlet port | 357 | Plate |
| S1 | Control port | 358 | Moon-shape step |
| S2 | Port for pressure gage | 359 | Hole |
| 302 | Positioner body | 360 | Ball |
| 304 | Horizontal bore | 361 | Spring |
| 306 | Vertical bore | 362 | Retaining ring |

-continued

| 308 | Groove | 365 | Chamber |
|---|---|---|---|
| 310 | Stepper bore a, b | 366 | Circumferential port |
| 312 | Port a, b | 370 | Pilot valve |
| 314 | Port | 371 | Housing |
| 320 | main valve | 372 | Indicator |
| 322 | side cap | 373 | Scotch-yoke assembly |
| 328 | Spool | 374 | Piston |
| 330 | Center land | 375 | Bore |
| 332 | End land a, b | 376 | yoke |
| 334 | Groove a, b | 377 | Key |
| 338 | Adjustable screw | 378 | Adjustable spring unit |
| 340 | Sleeve a, b | 379 | Pin |
| 342 | Axial slot | 380 | Adapter a, b |
| 344 | Circumferential slot | 381 | O-ring |
| 346 | Spring | 382 | Slot a, b |
| 348 | Chamber a, b | 383 | Window |
| 350 | Balance unit | 384 | Retaining ring |
| 352 | Feedback shaft | 385 | Cover |
| 353 | Axial port a, b | 388 | Lock screw |

DETAILED DESCRIPTION

Fluid-powered Actuation System

FIG. 1. illustrates a typical modular fluid-powered actuation system having two embodiments 50a, 50b constructed in accordance with the present invention. The embodiments 50a comprises a triple acting actuation model 100 and a positioning module 300 attached thereon, where the embodiment 50b comprises a double acting actuation module 200 and the positioning module 300 attached thereon.

Triple Acting Actuation Module

FIGS. 1-6 illustrate the actuation module 100 constructed in accordance with the present invention as a triple acting actuator. Actuator 100 comprises a body 102 having a vertical bore 104 expending to three horizontal passageways 106, in which three pistons 160 and an output shaft 122 interconnected by a linear-rotary converter unit 120a are movably disposed for converting linear movements of pistons 160 to a rotary movement of shaft 122.

The body 102 is mounted on top of a valve (not shown) and closed by three side caps 180a and a top cap 170 on which ports A1 and B1 are for fluid communications between an internal porting system and pressurized fluid source/release fluid sink (not shown) via module 300. Output shaft 122 is coupled with the valve at a first end 123a and with positioning module 300 at a second end 123b.

Three pistons 160 are constructed in a same manner shown in FIGS. 2, 4. The piston 160 is slidably disposed in passageway 106 and is provided with O-ring 167 and bearing 168 for sealing and smoothly engaging between passageway 106 and piston 160. A chamber 169a is defined by surfaces 162, bore 104 and top cap 170, three chambers 169b are provided between three surfaces 163 and three side caps 180a. O-ring 186 is provided for sealing between passageway 106 and side cap 180a. Piston 160 has a center threaded hole 164 receiving to a rod 150.

Figure 3:
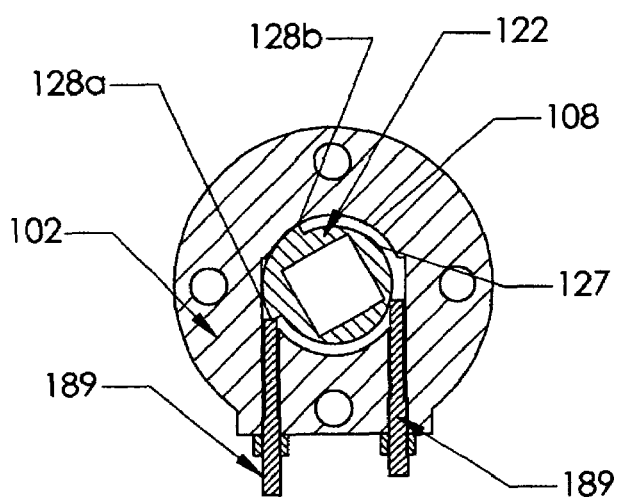
FIG. 3 is a cross-sectional view of triple acting actuation module of the upper embodiment of the fluid-powered actuation system of FIG. 1 along line 3-3.

The shaft 122 is rotatably mounted in holes 108 and 177 and is provided with a moon-shaped groove 127 defined by stoppers 128a, 128b and a position groove 126 shown in FIGS. 2, 3, 6, O-rings 124a, 124b are provided for sealing between holes 108, 177 and shaft 122, two position screws 188 are threaded through body 102 into groove 126 for preventing an axial movement between body 102 and shaft 122. Two control screws 189 are threaded through body 102 into the groove 127 for limiting a rotation of shaft 122. Screws 188, 189 can be constructed with limit switches (not shown).

The converter unit 120a includes a roller 130 having a center hole 134 receiving shaft 122 which is pinned to roller 130 by pin 135 for preventing a relative movement between roller 130 and shaft 122, the roller 130 is provided with a groove 131 receiving rods 150 and three circumferential openings 132 which are equally spanned and slidably engaged with bearings 158 for converting a movement shown in FIGS. 2,4. two guide plates 140 are disposed above and under the roller 130 and are respectively provided with a center hole 148 and three slots 142 which are equally spanned for constraining transverse movements of pins 157. One end 154a of rod 150 has a hole 156 for holding pin 157; other end 154b of rod 150 is threadedly attached to piston 160. Pin 157 is movably engaged with slots 142 at both ends of pin 157, and movably engaged with internal surfaces of two bearings 158 at middle of pin 157. With additional two bearings 158 (not shown) movably disposed between pin 157 and slots 142, a friction of linear-rotary conversion can be further reduced.

The internal porting system comprises two conduits in body 102 as well as in cap 170 shown in FIGS. 2, 4, a first conduit is provided with port B1 in cap 170 expending to circumferential port 174 which is connected to a groove 114 in body 102, groove 114 is sealed by two O-rings 178 and provided with three horizontal ports 110 extending to three chambers 169b via stepped bores 112. Second conduit in top cap 170 includes port A1 extending to chamber 169a.

This module 100 may be converted to a triple acting actuator with a rack-pinion converter 120b which replaces converter 120a for short stroke applications shown in FIG. 6. The roller 130 is replaced by geared bushing 136 which is pinned to shaft 122 by pin 135 for preventing a relative movement between geared bushing 136 and shaft 122. The bearings 158 are replaced by geared blocks 137 which are slidably engaged with geared bushing 136, while pins 157 are replaced by pins 138 which are disposed in geared blocks 137 and engaged movably with slots 142.

This module 100 may be converted to a triple acting actuator with a spring-return mechanism shown in FIG. 2 for safe-closed or safe-open applications. Caps 180b and springs 184 replace the side caps 180a.

The module 100 also has a plurality of construction methods. For lager actuator applications, body 102 can be constructed as four pieces; a vertical cylinder and three horizontal cylinders with additional bolts and gaskets for attaching to each other, and roller 130 can be constructed as two symmetric parts; upper part and lower part attached to output shaft 122 with two pins 135. For smaller actuator applications, shaft 122 can be constructed with roller 130 or geared bushing 136 as one part, while piston 160 and rod 150 can be made as one piece, two plates 140 can be respectively constructed with body 102, cap 170 as one piece. With such flexible constructions, cost of manufacturing for the actuators can be further reduced.

The module 100 is provided with a plurality of construction materials for a wide range of applications. For lower pressurized fluid applications, body 102, piston 160, roller 130, block 137, bushing 136, caps 170, 180a, 180b, rod 150 and plates 140 can be made out of plastic materials or aluminum alloy, for highly pressurized fluid applications, body 102, piston 160, roller 130, block 137, bushing 136, caps 170, 180a, 180b, rod 150 and plates 140 can be constructed with strong metal materials such as iron, steel and stainless steels to sustain the pressure. On the other hand, for highly corrosive applications, body 102, piston 160, roller 130, block 137, bushing 136, caps 170, 180a, 180b, rod 150 and plates 142 can be made out of composite materials, plastics such as PTFE or stainless steel such as 316, 416, for further improvements, internal wall of body 102, pistons 160, bearings 158, pins 157, roller 130, geared block 137, bushing 136 and plate 140 can be coated with epoxy or PTFE or other lower coefficient or anti-corrosive material. The pins 157, bearings 158, shaft 122 or other moving parts can be made of full or in part magnetic material, so position of shaft 122 can be sensed by a magnetic sensitive devices outside body 102. In short, the materials used on this present invention are suitable for the largest range of applications over all the related prior arts in the field.

In the best mode of operation of the actuation module 100, assume that shaft 122 which is inserted into roller 130 and lower plate 140, and secured by pin 135 are rotatably disposed in bore 104 in alignment between a center line of opening 132 and a center line of passageway 106, then the piston 160 which is attached to rod 150 having pin 157 and bearings 158 is inserted into passageway 106 so as to secure engagements between bearings 158 and openings 132, pins 157 are pressed down in slots 142 of lower plate 140, upper plate 140 is disposed above roller 130 in alignment between upper plate 140 and lower plate 140, then body 102 is closed by caps 170, 180a. Screws 188 are threaded into groove 126 through body 102 to position shaft 122, whereas two screw 189 are threadedly inserted through body 102 into groove 127 to set up a predetermined limit of rotation of shaft 122 with stoppers 128a, 128b. Then module 100 is mounted on top of a valve (not shown).

Port A1 and port B1 are respectively connected to a pressurized fluid source/a fluid sink (not shown) via positioning module 300, there is no movement of the piston 160 or that of shaft 122 shown in FIG. 4. When a pressurized flow fluid is allowed to enter chamber 169a through port A1, then spilt into three flows into passageways 106, the flow fluids provide sufficient pressure against pistons 160 from inward surface 162, while fluids in chambers 169b connected to the fluid sink via port B1 have a lower pressure, so pressure differentials cause linear movements of three pistons 160 outward in a synchronized manner shown in FIG. 5, as a consequence, bearings 158 constrained by pins 157 are biased against openings 132 to rotate shaft 122 clockwise. On the contrary, when the connections of ports A1 and port B1 with the fluid source/the fluid sink are switched, the conditions of flow fluids are reversed, shaft 122 is rotated anti-clockwise.

For short stroke applications, assume that converter unit 120a is replaced by converter unit 120b, shaft 122 which is inserted into geared bushing 136, and secured by pin 135, and lower plate 140 are disposed in bore 104, then pistons 160 which are respectively attached to rod 150 having geared block 137, and pin 138 are inserted into passageways 106 so as to secure engagement between geared blocks 137 and geared bushing 136, pins 138 are pressed down in slots 142, upper plate 140 is disposed above geared bushing 136 in alignment with lower plate 140, then body 102 is closed by cap 170 and caps 180a, the operation is similarly to actuator 300 with converter 120a except the conversion which is implemented by engagement between geared blocks 136 and geared bushing 137.

For safe-closed or safe-open applications, assume that side caps 180a are replaced with side caps 180b and springs 184, and port B1 is open, when a pressurized fluid is allowed to enter port A1, the fluid through chamber 169a provides sufficient forces to move outward three pistons 160 biased by springs 184 until the forces on both sides of piston 160 reach a balance, when port A1 is switched to connect to the fluid sink or loses power, the pistons 160 are moved inward by springs 184, in turn shaft 122 is rotated clockwise.

The present invention provides a long sought solution to a fundamental problem on the linear-rotary conversion mechanism; unbalanced side loading forces, some manufactures conclude that the unbalanced side loading forces are inherent. The converter unit 120a not only eliminates any side loading force on piston 160 by attaching one end 154b of rod 150 on a center of piston 160 unlike conventional rack-pinion actuators with off-center geared skirts, but also balances any side loading force on shaft 122 and roller 130 by employing three pins 157 to engage with six slots 142 of plates 140 and six openings 132 of rollers 130 for converting three linear movements of rods 150 to a rotary movement of shaft 122, unlike conventional scotch-yoke actuators with an unbalanced side forces on one arm yoke and a rod, or most conventional rack-pinion actuators with internal wall of body to support the side loading forces created by rack-pinion engagement and off-center geared skirts. A driver system comprising converter unit 120a or 120b, pistons 160 and shaft 122 completely balances itself and eliminates any friction between roller 130 and bore 104, any friction associated with rod 150.

More importantly, output torque generated by actuator 100 is much higher, smoother, less sticking, less creeping and more efficient than most conventional rotary actuators due to nature of balanced arrangement of converter unit 120a, 120b, so life of actuator 100 based on this invention will be much longer. In addition, rod 150 is never subject to any bending unlike most conventional scotch-yoke actuators, so the diameters rod 150 can be made much smaller only to support loading either compression or tension, while shaft 122 along with roller 130 can be constructed much smaller only to support torsion.

The present invention solve other problem inherently associated with conventional scotch-yoke actuators; backlash, or loss motion of output shaft, because of clearance between bearing and openings of yoke, as numbers of operation is increased, so is the clearance due to rubbing between them, when an output shaft is switching rotation from clockwise to anti-clockwise, the backlash or loss motion happens. The backlash causes loss of control of valve position, damage of output shaft or other parts of valve or actuator and weakens joint between valve and actuator and is a nightmare for control valve engineers. For a conventional scotch-yoke actuator, it is impossible to eliminate the backlash, or loss motion, because of clearance between the bearing and the openings of yoke, but with this invention, bearings 158 and openings 132 are designed with three different fits, left side clearance, right side clearance and bilateral clearance, so the shaft 122 will not show backlash or loss motion even after many operations.

The present invention provides distinguished advantages; compact, balanced and efficient. Most conventional rack-pinion actuators are relatively compact but not efficient due to unequal fluid volume between port A1 and port B1, while most conventional scotch-yoke actuators are not only inefficient due to unequal fluid volume between both sides chambers of piston, but also not compact due to a large driver unit and sometime unbalanced weight on both sides of driver unit and arrangement of cylinders, for high frequency cycle application, the unbalanced weight or loading force can damage output shaft or adapters, but with the converter units 120a, 120b and bore 104, the conventional large driver unit is efficiently utilized. This invention not only maximizes acting-effective surfaces in bore 104, but also minimizes void volume in chamber 169a, moreover, this actuator can be used for hydraulic-electronic control under water or over the space applications as well as high frequency cycle applications or in a high vibration environment.

Other novel construction of this invention is the internal porting system, most conventional scotch yoke actuators with two cylinders employ an external porting system, although the conventional rack-pinion actuators have an internal porting system, they can not be directly connected to a positioner without additional tubes, adapters and bracket. With this internal porting system based on simple machining, the actuator 100 not only eliminates extra adapter, tubes and bracket and any possibility of the porting system breakdown due external contact, corrosion or accident hits, but also increase reliability of the actuation system for critical applications, more importantly, the internal porting system reduces response time of actuator 100 for critical application, specially like an emergency shutoff for lager valves, where rack-pinion actuators are no longer capable to generate a heavier torque. Ports A1, B1 can be constructed with a porting pattern in compliance with conventional rack-pinion actuators.

The present invention further provides other novel, compact positing and adjusting constructions. Two screws 189 and two screws 188 are located on a stronger bottom section of the actuator 100 and outside O-ring 124a sealing area, so there is no leakage path, stoppers 128a, 128b hitting screws 189 will not weak strength of shaft 122 and body 102, screws 189 and 188 can be constructed with a plurality type of limit switches such as mechanical, magnetic or proximity for on-off control, moreover, with one point positing between screw 188 and groove 126, the assembly of actuator 100 become more forgiving and easier.

Double-Acting Actuation Module

FIGS. 1, 7-11 illustrate actuation module 200 constructed as a double acting actuator in accordance with the present invention. The actuator 200 comprises a body 202 having a horizontal passageway 204 extending to vertical hole 206 and a lower counter bore 208 in which a linear-rotary converter unit 220 is moveably disposed, the converter unit 220 is provided with a pair of pistons 240 and an output shaft 222 pinned to a geared bushing 224 for converting liner movements of pistons 240 to a rotary movement of shaft 222.

The body 202 is mounted on a valve (not shown) and attached to positioning module 300 with an interface 210 on which ports E1, D1 are for fluid communications between an internal porting system and pressurized fluid source/release fluid sink (not shown) via module 300 shown in FIGS. 1,7. The shaft 222 is coupled with the valve at a first end 223a and positioning module 300 at a second end 223b.

Two pistons 240 are axially opposed, and slidably disposed in passageway 204 shown in FIGS. 7, 8 and include radically opposed skirts 242 having gear racks 243 in inner surfaces to operatively engage with geared bushing 224 in center of passageway 204. The pistons 240 further include radically opposed two guide bars 244 which are secured by thread holes 245 and lock nuts 246 at ends 259a and are slidably engaged with two opposed holes 247 at ends 259b for guiding a linear movement of pistons 240. Piston 240 has a damping hole 248 extending to hole 247 and is provided with O-ring 256 and bearing 258 for sealing and smooth engagement between passageway 204 and pistons 240. One chamber 254b is provided between inward surfaces 250 of pistons 240, while two chambers 254a are defined between outward surfaces 252 of pistons 240 and two side caps 260a, O-rings 264 are provided for sealing between bore 204 and side caps 260a.

The shaft 222 is rotatablely mounted in holes 206 and counter bore 208 and is provided with a moon-shaped groove 232 defined by stopper 238a, 238b, O-rings 228 is provided for sealing between hole 206 and shaft 222, a seal between shaft 222 and bore 208 is provided with two O-ring 230a which are attached to shaft 222 and O-ring 230b which is attached to bore 208 when shaft 222 is rotated in bore 208, bearing 234 is disposed in counter bore 212 for supporting shaft 222, the geared bushing 224 is pinned to shaft 222 by pin 226 for preventing a relative movement between bushing 224 and shaft 222. Two position screws 262 are threaded into the groove 232 through body 202 for preventing an axial movement between body 202 and shaft 222. Screws 268 are threaded through body 202 into groove 232 for setting a limit of rotation of shaft 222, screws 262, 268 can be made with limit switches (not shown) for on-off control, a relief groove 218 is provided for facilitating rotation of shaft 222 shown in FIG. 10.

The internal porting system of actuation module 200 comprises two conduits, a first conduit includes port D1 extending to a horizontal port 214 which is connected to chambers 254a, 254b via stepped bores 216 shown in FIGS. 7, 8, 11, a second conduit is provided with port E1 extending to chamber 254b, ports E1, D1 are provided for direct connection to inlet/outlet ports of positioning module 300 shown in FIG. 7.

This module 200 may be converted to a double acting actuator with a spring-return mechanism shown in FIG. 7 with springs 266 and side caps 260b which replace side caps 260a for safe-closed or safe-open applications.

In the best mode of operation of module 200, assume that shaft 222 is inserted into body 202 from bore 208, geared bushing 224 is inserted into passageway 204, shaft 222 is pinned to geared busing 224 by pin 226. Pistons 240 having guide bars 244 are inserted in passageway 204 so as to secure engagements between geared bushing 224 and geared racks 243, and between guide bars 244 and holes 247. Screws 262 are threaded through body 202 into groove 232 to position shaft 222, whereas the two screw 268 are threaded through body 202 into groove 232 to set up a predetermined limit of rotation of shaft 222. Then the module 200 is mounted on top of a valve (not shown).

Ports E1, D1 are respectively connected to pressurized fluid source/release fluid sink through positioning module 300, there is no movement of piston 240 and that of shaft 222 shown in FIG. 8. When a pressurized fluid is allowed to enter chamber 254b through port E1, the fluid provides sufficient pressure against pistons 240 from inward surface 250, while fluids in chambers 254a which is connected to the fluid sink via port D1 have a lower pressure, so pressure differential between chambers 254a, 254b causes linear movements of two pistons 240 outward in a synchronized manner shown in FIG. 11, as a consequence, geared bushing 224 engaged with gear racks 243 is to rotate shaft 222 clockwise, bars 244 are guided and supported by holes 247. On the contrary, when the connections of port E1 and port D1 with the fluid source/fluid sink are switched, the shaft 222 is rotated anti-clockwise.

For safe-closed or safe-open applications, assume that caps 260a are replaced with side caps 260b and springs 266 shown in FIG. 7, and port D1 is open, when a pressurized fluid is allowed to enter port E1, the fluid through chamber 254b provides sufficient forces to move pistons 240 and springs 266 which is biased against outward surface 252 until the forces on both sides of piston 240 reach a balance, when port E1 is switched to connect to the fluid sink or loses power, the pistons 240 are moved inward by springs 266 in turn, shaft 222 is rotated clockwise.

The present invention provides a long sought solution to a fundamental problem on the rack-pinion rotary conversion mechanism; unbalanced side-loading forces. The piston 240 has two supporting points for converting a linear movement to rotary movement, one is hole 247, other is bar 244, those two points which are located equally off-center define two equally, opposed, balanced moments under a pressurized fluid unlike conventional rack-pinion actuators with pistons having off-center geared skirts which create unbalanced moments under a pressurized fluid, on the other hand, bars 244 and holes 247 are provided for supporting pistons 240 and balancing the side loading force caused by engagement between geared bushing 224 and geared racks 243, while conventional rack-pinion actuators in all prior arts are provided with internal wall of cylinder to support the side loading force, as results the high friction between the wall and piston reduce output torque and cause premature wearing, so the present invention successfully solve the problem facing the industries for so long. The actuator 200 complete balances itself and eliminates any friction between skirts 242 and passageway 204. More importantly, guide bars 244 with holes 247 and ports 248 create a damping mechanism to ease impact force when two pistons 240 move closely to each other. With this invention, thickness of body 202 can be reduced, and output of torque of actuator 200 will be much higher and more efficient than most conventional rack-pinion actuator, and life of the actuator based on this invention will be much longer.

The present invention also provides other long sought solution to a fundamental problem; a leakage between a rotary shaft and a bore under side loading. Rotary shafts are used in many fluid-related devices including; actuators, pumps, compressors and rotary valves, the conventional solution to the problem is to provide with O-ring, or V-packing ring, U-packing ring which is either attached to the shaft or the bore for filling gaps between the shaft and the bore. Such solutions are based on a static, ideal geometry fit between a shaft and a bore, but in the reality, axis of the shaft and that of the bore are never aligned up or concentric when the shaft is rotated in the bore, so gaps between the shaft and the bore are not even and variable, the locations and magnitudes of the maxim gap are changing as the shaft is rotated in the bore under side loading, as a result, insider diameters of the conventional rings which are attached to the bore are increasing as the shaft is rotating, while sealing outside diameters of conventional rings which are attached to the shaft is decreasing as the shaft is rotated in the bore. Those arrangements of conventional seal rings either create high operating torque due to excess interference, or have unreliable seal due to uneven interference.

The present invention provides a simple solution to the above problem with one O-ring 230b attached to bore 208 and two O-rings 230a attached to shaft 222 when shaft 222 is rotated in bore 208, in fact, a seal between shaft 222 and bore 208 becomes a seal between O-rings 230a and O-ring 230b, because O-rings 230a, 230b which are made out of more flexible material such as rubber, PTFE or more flexible shape, size like thin sheet metal rings are more capable to fill in gaps and less wearing in comparison with the shaft 222 and bore 208 which are made out of less flexible materials such as steel or less flexible shape, size like bar, body, so inside diameter of O-ring 230b will not increase due to two O-rings 230a during rotation of shaft 222, while sealing outside diameter of O-rings 230a will not reduce due to O-ring 230b. In conclusion, this seal arrangement dramatically improve sealing and reduce wearing of O-rings 230a, 230b and operation torque over all efforts in prior arts, other rings with different cross sections such as V, U X shapes can also be used for this seal.

The present invention further provides other novel feature; a combined position and rotation control structure. The structure is provided with two control screws 268 and two position screws 262, which are threaded into the moon-shape groove 232 through a stronger bottom of actuator 200 and outside O-ring 230a sealing area shown in FIGS. 9,10, there is no leakage path, even every time shaft 222 hitting screws 268 will not weak strength of shaft 222 or body 202. Moreover screws 268, 262 can be constructed with a plurality type of limit switches such as mechanical, magnetic or proximity for on-off control and with one point positing between screw 262 and groove 232, the assembly of actuator 200 becomes more forgiving and easier, shaft 222 becomes much compact.

The internal porting system is other novel structure of this invention. With the direct connection between actuator 200 and positioning module 300 on interface 210, there is no need for extra tubes, adapter and bracket, so this system not only eliminates any possibility of breakdown due to external contact, corrosion or accident hits of adapter, tubes and bracket, but also increases reliability of the actuation system for critical applications at lower cost, more importantly, the internal porting system reduces a response time and can be used for critical applications, like an emergency shutoff. While internal porting systems in most conventional rack-pinion actuators have inlet/outlet ports on side interface of body with additional internal ports on side caps, those systems not only need expensive machining or porting on side caps, additional tube and brackets for connection between valves and actuators, but also have lower reliability.

Positioning Module

FIGS. 1,12-22 illustrate the positioning module 300 in accordance with the present invention. This positioning module 300 is constructed as a two-staged, self-feedback servo positioner which comprises a pilot valve 370, a body 302 having a main valve 320 and a balance unit 350.

The body 302 is mounted on modules 100 or 200 and is provided with a horizontal bore 304 in which main valve 320 is arranged to direct fluids between sink/source ports K1, L1 and inlet/outlet ports M1, N1, ports K1, L1 are respectively connected to a fluid sink and a pressurized fluid source (not shown), ports M1, N1 are respectively connected to inlet/outlet ports of actuation modules 100 or 200. Body 302 is further provided with a vertical bore 306 in which balance unit 350 is rotatably disposed for connection between pilot valve 370 and main valve 320, and for eliminating a difference between a set position provided by pilot valve 370 and a feedback position provided by actuators 100 or 200.

The main valve 320 comprises a spool 328 slidably disposed in bore 304 extending to ports N1, M1 and port K1 via groove 308, bore 304 is provided with two stepped bores 310a, 310b in which two sleeves 340 are disposed with press-fit and are closed by two side caps 322, two springs 346 are disposed into both ends of spool 328 with an adjustable screw 338, lands 332a, 332b, 330 are positioned either to direct fluids in and out from ports M1, N1 or at a null position, depending on the position of spool 328, chambers 348a, 348b are for fluid communications between port L1 and ports 312a, 312b shown in FIGS. 13,14. Sleeve 340 is provided with four equally spanned, axial slots 342 extending to four circumferential slots 344 which are provided for fluid communications respectively between chambers 348a, 348b and grooves 334a, 334b when spool 328 is not at a null position. Port L1 is connected to chambers 348a, 348b via port 314 shown in FIG. 13, ports 312a and 312b are for fluid communications between main valve 320 and balance unit 350 shown in FIGS. 13,14.

The pilot valve 370 is mounted on body 302 and includes a housing 371 having a position indicator 372 and a scotch-yoke assembly 373 shown in FIGS. 12,15, 16. The assembly 373 comprises a yoke 376 and a piston 374 having pin 379 movably disposed in bore 375 for converting a linear movement of piston 374 generated by a input signal defined by a pressurized fluid from ports S1 or S2 to a rotary movement of yoke 376, O-ring 381 is provided for sealing between piston 374 and bore 375, yoke 376 is coupled with top end of input shaft 356 and is secured by lock screw 388 for setting a desired position of input shaft 356, one end of piston 374 is biased against an adjustable spring unit 378 for setting a pressure of a control fluid, other end of piston 374 is connected to port S1, the indicator 372 comprises adapters 380a, 380b which are respectively engaged with key 377 at slot 382a, and with top end of shaft 352 at slot 382b, a retaining ring 384 is provided to prevent an axial movement of indicator 372, a cover 385 is mounted on housing 371 and is provided with a window 383 which is made out of a transparent material having indications of degree units and open/closed signs or other desired information. The input signal also can be defined by a linear stepper motor unit (not shown) or manual knob unit (not shown) in stead of a pressurized fluid to move the piston 374 back and forth for setting a input position.

The balance unit 350 comprises the input shaft 356 attached to pilot valve 370 and the feedback shaft 352 coupled with actuation module 100 or 200 shown in FIGS. 12,16,17, shaft 352 is disposed rotatably in bore 306 and includes an axial port 353b expending to groove 354b via circumferential port 366 and an axial port 353a expending to groove 354a, ports 353a, 353b with a similar diameter are radically opposed and equally apart from axis of shaft 353, grooves 354a, 354b are respectively connected to left port 312a, right port 312b shown on FIGS. 13,14. O-rings 355 are provided to seal off between groove 354a and 354b, and between bore 306 and shaft 356. Shaft 356 is provided with a plate 357 having a 180 degree, moon-shape step 358 covering half of port of 353a and half of port 353b, two holes 359 on plate 357 are defined as same as ports 353a, 353b and located proximally on edges of step 358, two balls 360 in holes 359 are movably disposed and biased by two springs 361 and cover ports 353a, 353b with a larger diameter for sealing and positioning, balance unit 350 is constrained by a retaining ring 362 to prevent an axial movement, port K1 is extended to chamber 365 for venting a fluid from port 353a or port 353b shown in FIG. 16.

The positioner 300 can be constructed as servo valve with a rotary stepper motor or more rotary stepper motors (not shown) in replace of pilot valve 370. By shortening top end of shaft 352, the rotary stepper motors can be directly coupled with shafts 356,352 in series from top and bottom of body 302 for digital control without A/D, D/A converters and especially for high reliable applications such as aircraft actuation and fuel delivery system or medical equipment which require a high redundancy.

The positioner 300 can be used with single acting actuators by blocking of port M1 and can be used for linear actuator applications with a scotch-yoke assemblies (not shown) like assembly 373 mounted on end of shaft 352.

A plurality of constructions materials of positioner 300 are provided for a wide range of applications, for lower pressure applications, body 302, shafts 356, 352 and side caps 322a, 322b can be made out of a plastic material or aluminum alloy, for high pressure applications, body 302, shafts 356, 352 and side caps 322a, 322b can be constructed with a metal material such as 316, 416 stainless steels.

In the best mode of operation of the positioner 300, assume that sleeves 340a, 340b have been inserted into bores 310a, 310b with pressure fit, spool 328 having adjustable screw 338 is inserted into bore 304 and sleeves 340a, 340b, then two springs 346 are inserted in both ends of spool 328, two side caps 390 are secured by bolts shown in FIG. 17, balance unit 350 unit is inserted into bore 306 shown in FIG. 16 and is constrained axially by retaining ring 362, then pilot valve housing 371 is mounted on top of body 302. Shaft 356 and yoke 376 are secured by screw 388, and indicator 372 is constrained axially by retaining ring 384. Positioner 300 is mounted on actuator 100 or 200. Port S1 is connected to a pressurized control source. Port S2 can be connected to a pressure gauge or pressure sensor or be blocked off. Ports K1, L1 M1 and N1 are respectively connected to a fluid sink (not shown), a pressurized fluid source (not shown) and inlet/outlet ports of actuator 100, or 200.

When there is no force generated by an input signal in pilot valve 370, the input shaft 356 remains balanced with the feedback shaft 352, both ports 353a, 353b are covered by balls 360 and step 358, the pressures of fluids at both chamber 348a, 348b via ports L1 and 314 are equal, so spool 328 with a pair of springs 346 stays at a central, null position shown in FIG. 17, wherein lands 332a, 332b, 330 seals off ports N1, M1 from port K1, L1 and actuator 200 or 100 remains unmoved. When a force generated by the input signal is provided to move piston 374 to left and rotate shaft 356 anti-clockwise at a desired position shown in FIG. 18, ball 360 and step 358 uncover port 353b shown in FIG. 19, then pressured fluid from port 312b freely enters groove 354b, port 353b and chamber 365 and vents into a fluid sink via port K1, while step 358 fully covers port 353a, no fluid comes from port 312a.

This occurrence creates a pressure differential between chamber 348a and chamber 348b, wherein the fluid pressure within chamber 348a is substantially greater than that within chamber 348b, thereby forcing spool 328 to move to right against a relatively light resistance of spring 346 show in FIG. 20. Upon the movement of spool 328, grooves 334a, 334b are respectively connected to port K1 via groove 308 and chamber 348b, thereby allowing the pressurized fluid from source port L1 to vent to through port M1 to inlet port of actuator 100 or 200 and port K1 to connect to outlet port of actuator 100,200 through port N1 to vent the fluid to the fluid sink, and rotate actuator 100 or 200 antic-clockwise as well as shaft 352. When feedback shaft 352 reaches the position where balls 360 covers port 353a, 353b, the pressurized fluid is cut off shown in FIG. 16, but because hysteresis between action of positioner 300 and that of actuator 200 or 100, shaft 352 continues to rotate and pass the null position, then pressure differential condition is reversed, as result, shaft 352 rotates clockwise as shown in FIG. 21, spool 328 moves to left as shown in FIG. 22, as balls 360 are closer to ports 353a, 353b, the fluid flow out of ports 353a, or 353b is reducing, with balls 360 centering function and a few loop of rotating clockwise and anti-clockwise, shaft 352 finally reaches the null position with shaft 356 shown in FIG. 17. Similarly, when a force is provided to rotate shaft 356 clockwise.

The present invention provides a simple, self-balance input/feedback shafts mechanism directly based on "position" not on "force-position". Those skilled in the art will appreciate the fact that with a position as a simple control variable, the reliability of the positioner 300 is dramatically improved, especially for applications of high vibration, high cycle, or quick closing or opening, where dynamic body force is significantly interfered with control of conventional positioner based on force-position variables, and there is no existing fluid-related positioner can be employed. With a pair of balls 360, even after many cycles, the positioner still remains the same accuracy, because coefficient of friction of rolling is much lower than that of sliding, more importantly, the centering of ball 360/hole 353a, 253b stabilizes a position of shaft 356 without additional holding mechanism. On aspect of control system, a set point of position is generated only once by input shaft 356, without feedback sensing, the control system become much simpler and more stable. Other most obviously advantage over all prior art is no need for adjustment between shaft 356 and shaft 352 to the null or balanced position.

The present invention also provides the novel pilot valve 370 with multiple sources of input signal. With modularization of pilot valve 370, an input signal can be easily generated by a pressurized fluid, manual knob unit, or linear stepper motor unit, such versatility of control means is vital for critical services, such as airplane, outdoor scientific research, military operation, medical emergence, or oilfield. In addition, the indicator 372 with set point and feedback point puts the fluid-related positioner to a new level to match with electronic positioners.

The present invention further provides a most user-friendly, simple rotary control mechanism. With simple main valve 320 and balance unit 350 coupled by a rotary stepper motor, a digital control system can be easily implemented without A/D and D/A converters, and different position points can be easy set with a relative angular position for example, 0-90 degree in an open or closed loop application with easy tuning and setting a null position, so the stepper motor can be employed on various sizes of main valve 320 without resetting any control parameter, the positioner 300 completely eliminates all disadvantages related with traditional servo valves based on analog flapper-nozzle, which are not only difficult to set a null position and to be digitized for digital control, but also expensive to manufacture with additional flapper/nozzle and filter and is susceptible to fluid contamination. Moreover with rotary stepper motors (not shown) attached to each of shafts 356, 352 in series, double or tripe redundancy control can be easily implemented, when input shaft 356 is failed to rotate, the feedback shaft 352 can act due to nature of float null positioning mechanism of balance unit 350, or second stepper motor attached to input shaft 356 can act to rotate, and some of the rotary stepper motors as secondly driving motors can be used as position encoders to add more reliable, redundant feathers to a control system.

The present invention provides other long sought solution to problem; internal porting for connection between port L1 and grooves 334a, 334b in main valve 320, with slotted sleeve 340, the internal porting become much simpler in comparison with conversational servo valve, the internal porting not only reduces machining cost by eliminating two ports to grooves 334a, 334b from port L1 and maintenance cost by replacing the sleeves 340 instead of valve body 302, but also provides four balanced fluid forces through slots Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:

1. An actuation assemblies comprising;
   (a) A body having a vertical bore extending to three horizontal passageways;
   (b) Three pistons, each piston slidably positioned in a respective one of said passageways for reciprocating;
   (c) An output shaft rotatably positioned within said body;
   (d) A conversion-transmission means operatively associated with said pistons and said output shaft for converting movements between reciprocating movements of said pistons and a rotary movement of said output shaft, said conversion-transmission means comprises a roller attached to said output shaft, said roller has three, equally spanned, axial openings for converting movements, respected one of said openings is engaged with a rotatable bearing having an internal wall engaged with a rotatable pin, respected one of said pins is linked to respected one of said pistons by a piston rod, said conversion-transmission means also has at least a guide plate being vertically adjacent to said roller, said plate has a plurality of slots which are equally spanned for constraining and supporting said pins.

2. The actuation assembly of claim 1, wherein said roller is constructed with a plurality of forms including one upper piece and one lower piece, said upper piece and said lower piece are symmetric and attached to said output shaft.

3. The actuation assembly of claim 1, wherein said output shaft and said roller are constructed as one piece.

4. The actuation assembly of claim 1, wherein said bearing, said pins and said roller and said output shaft are either made out of full magnetic materials or partial magnetic materials.

5. The actuation assembly of claim 1, further including a position means for controlling a rotational movement of said output shaft, said position means includes a pair of screws threaded through said body into a moon-shaped groove defined by two stoppers on said output shaft, said screws with said moon-shaped groove are constructed with a plurality of types of limit switches.

6. An actuation assemblies comprising;
   (a) A body having a vertical bore extending to three horizontal passageways;
   (b) Three pistons, each piston slidably positioned in a respective one of said passageways for reciprocating;
   (c) An output shaft rotatably positioned within said body;
   (d) A conversion-transmission means operatively associated with said pistons and said output shaft for converting movements between reciprocating movements of said pistons and a rotary movement of said output shaft, said conversion-transmission means comprises a geared bushing attached to said output shaft, said geared bushing is engaged with three geared blocks for converting movements and receive a plurality of rotatable pins, respected one of said geared blocks is linked to respected one of said pistons by a piston rod, said conversion-transmission means also has at least a guide plate being vertically adjacent to said geared bushing, said guide plate has a plurality of slots which are equally spanned for constraining and supporting said pins.

7. The actuation assembly of claim 6, wherein said output shaft and said geared bushing are constructed as one piece.

8. The actuation assembly of claim 6, wherein said geared blocks, said geared bushing and said output shaft are either made out of full magnetic materials or partial magnetic materials.

9. The actuation assembly of claim 6, further including a position means for controlling a rotational movement of said output shaft, said position means includes a pair of screws threaded through said body into a moon-shaped groove defined by two stoppers on said output shaft, said screws with said moon-shaped groove are constructed with a plurality of types of limit switches.

10. A motion conversion-transmission means in an actuation system operatively associated with three horizontal pistons and a vertical output shaft for converting movements between reciprocating movements of said pistons and a rotary movement of said output shaft, said means comprises a geared bushing attached to said output shaft, said geared busing is engaged with three geared blocks for converting movements and receive a plurality of rotatable pins, each of said geared blocks is linked to each of said pistons by a piston rod, said conversion-transmission means also has at least a guide plate being vertically adjacent to said geared bushing, said guide plate has a plurality of slots which are equally spanned for constraining and supporting said pins.

* * * * *